US009641844B2

(12) United States Patent
Kim et al.

(10) Patent No.: US 9,641,844 B2
(45) Date of Patent: May 2, 2017

(54) METHOD AND APPARATUS FOR SELECTING A PREDICTION MODE, AND IMAGE ENCODING/DECODING METHOD AND APPARATUS USING SAME

(75) Inventors: Sunyeon Kim, Seoul (KR); Yunglyul Lee, Seoul (KR); Joohee Moon, Seoul (KR); Haekwang Kim, Seoul (KR); Byeungwoo Jeon, Seongnam-si (KR); Daeyeon Kim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 667 days.

(21) Appl. No.: 13/264,311

(22) PCT Filed: Apr. 14, 2010

(86) PCT No.: PCT/KR2010/002307
§ 371 (c)(1),
(2), (4) Date: Oct. 13, 2011

(87) PCT Pub. No.: WO2010/120113
PCT Pub. Date: Oct. 21, 2010

(65) Prior Publication Data
US 2012/0039388 A1 Feb. 16, 2012

(30) Foreign Application Priority Data

Apr. 14, 2009 (KR) .................. 10-2009-0032142

(51) Int. Cl.
*H04N 19/61* (2014.01)
*H04N 19/11* (2014.01)
*H04N 19/14* (2014.01)

(52) U.S. Cl.
CPC ............ *H04N 19/11* (2014.11); *H04N 19/14* (2014.11); *H04N 19/61* (2014.11)

(58) Field of Classification Search
CPC .... H04N 19/176; H04N 19/61; H04N 19/147; H04N 19/124; H04N 19/513;
(Continued)

(56) References Cited

U.S. PATENT DOCUMENTS 6,148,033 A * 11/2000 Pearlstein ............ H04N 19/105
375/240.16
6,799,294 B1 * 9/2004 Chung et al. ................. 714/786
(Continued)

FOREIGN PATENT DOCUMENTS

KR    1020050112445 A    11/2005
KR    10-2007-0037532     4/2007
(Continued)

OTHER PUBLICATIONS

International Search Report mailed Nov. 12, 2010 for PCT/KR2010/002307.
(Continued)

*Primary Examiner* — Dave Czekaj
*Assistant Examiner* — Kehinde O Abimbola
(74) *Attorney, Agent, or Firm* — Hauptman Ham, LLP

(57) ABSTRACT

The present disclosure concerns a method and apparatus for selecting an intra prediction mode and a video encoding/decoding method and apparatus using same. The encoding apparatus selects an intra prediction mode of current block to encode from input video by a variation of the value of pixel adjacent to the current block; encodes a residual block from intra-predicting the current block in the selected intra prediction mode of current block to generate coded coefficient bit having a bitstream generator for generating and outputting a bitstream including the coded coefficient bit and a prediction mode bit representing the selected intra prediction mode of current block by a macroblock or subblock unit with the prediction mode bit included selectively in the
(Continued)

bitstream depending on the variation. Accordingly, selection process of a prediction mode for image compression is simplified, a faster compression is obtained and compressed data is deflated to improve compression efficiency.

20 Claims, 14 Drawing Sheets

(58) Field of Classification Search
CPC ...... H04N 19/91; H04N 19/51; H04N 19/593; H04N 5/145; H04N 19/137; G06T 7/2053; G06T 2207/10016; G06T 2207/20144; G06T 2207/20182
See application file for complete search history.

(56) References Cited

U.S. PATENT DOCUMENTS

| | | | | |
|---|---|---|---|---|
| 6,983,018 | B1* | 1/2006 | Lin et al. | 375/240.16 |
| 8,036,270 | B2* | 10/2011 | Zhao | H04N 19/172 |
| | | | | 348/447 |
| 8,107,532 | B2* | 1/2012 | Gaedke | H04N 19/105 |
| | | | | 375/240.01 |
| 8,244,050 | B2* | 8/2012 | Kim | 382/238 |
| 8,249,154 | B2* | 8/2012 | Chen | H04N 19/176 |
| | | | | 375/240.12 |
| 8,325,796 | B2* | 12/2012 | Wilkins et al. | 375/240.02 |
| 8,457,211 | B2* | 6/2013 | Kwon | 375/240.24 |
| 8,571,104 | B2* | 10/2013 | Ye | H04N 19/503 |
| | | | | 375/240.14 |
| 2005/0036759 | A1* | 2/2005 | Lin et al. | 386/46 |
| 2005/0152452 | A1* | 7/2005 | Suzuki | 375/240.16 |
| 2005/0157797 | A1* | 7/2005 | Gaedke | H04N 19/105 |
| | | | | 375/240.24 |
| 2005/0276323 | A1* | 12/2005 | Martemyanov et al. | 375/240.03 |
| 2006/0193527 | A1* | 8/2006 | Kalva et al. | 382/239 |
| 2008/0025397 | A1* | 1/2008 | Zhao | H04N 19/172 |
| | | | | 375/240.13 |
| 2008/0310745 | A1* | 12/2008 | Ye | H04N 19/61 |
| | | | | 382/238 |
| 2009/0052526 | A1* | 2/2009 | Fukuda et al. | 375/240.03 |
| 2009/0175334 | A1* | 7/2009 | Ye et al. | 375/240.12 |
| 2009/0219993 | A1* | 9/2009 | Bronstein | H04N 19/61 |
| | | | | 375/240.03 |
| 2009/0232207 | A1* | 9/2009 | Chen | H04N 19/176 |
| | | | | 375/240.12 |
| 2010/0054616 | A1* | 3/2010 | Kim | 382/238 |
| 2010/0061444 | A1* | 3/2010 | Wilkins et al. | 375/240.02 |
| 2010/0061461 | A1* | 3/2010 | Bankoski et al. | 375/240.16 |
| 2010/0061645 | A1* | 3/2010 | Wilkins et al. | 382/238 |
| 2013/0044812 | A1* | 2/2013 | Ye et al. | 375/240.12 |

FOREIGN PATENT DOCUMENTS

| | | |
|---|---|---|
| KR | 10-2008-0068276 | 7/2008 |
| KR | 10-2008-0090937 | 10/2008 |

OTHER PUBLICATIONS

Korean Office Action for application No. 10-2009-0032142 dated Oct. 7, 2013.

* cited by examiner

7A

| M | A | B | C | D | E | F | G | H |
|---|---|---|---|---|---|---|---|---|
| I | a | b | c | d | | | | |
| J | e | f | g | h | | | | |
| K | i | j | k | l | | | | |
| L | m | n | o | p | | | | |

7B

| N | N | N | N | N | N | N | N | N |
|---|---|---|---|---|---|---|---|---|
| N | a | b | c | d | | | | |
| N | e | f | g | h | | | | |
| N | i | j | k | l | | | | |
| N | m | n | o | p | | | | |

METHOD AND APPARATUS FOR SELECTING A PREDICTION MODE, AND IMAGE ENCODING/DECODING METHOD AND APPARATUS USING SAME

CROSS REFERENCE TO RELATED APPLICATION

This application claims the priority of Korean Patent Application No. 10-2009-0032142, filed on Apr. 14, 2009 in the KIPO (Korean Intellectual Property Office). Further, this application is the National Phase application of International Application No. PCT/KR2010/002307, filed on Apr. 14, 2010, which designates the United States and was published in Korean.

TECHNICAL FIELD

The present disclosure relates to a method and apparatus for selecting a prediction mode, and to an image encoding/decoding method and apparatus using same. More particularly, the present disclosure relates to a method and apparatus for simplifying the process of selecting the prediction mode for compressing the image to increase the compression speed and reduce the quantity of the compressed data and thereby improve the compression efficiency.

BACKGROUND ART

The statements in this section merely provide background information related to the present disclosure and may not constitute the prior art.

Moving Picture Experts Group (MPEG) and Video Coding Experts Group (VCEG) have developed an improved and excellent video compression technology over existing MPEG-4 Part 2 and H.263 standards. The new standard is called H.264/AVC (Advanced Video Coding) and was released simultaneously as MPEG-4 Part 10 AVC and ITU-T Recommendation H.264.

In the image compression techniques such as H.264/AVC, various prediction techniques are employed including an inter prediction and an intra prediction to obtain effective image compressions. The above described intra prediction may be an intra_4×4 prediction, intra_16×16 prediction, intra_8×8 prediction and the like, where the respective intra predictions include a plurality of prediction modes.

The image compression techniques such as H.264/AVC select an optimal prediction mode out of a plurality of prediction modes and performs a prediction. Therefore, what prediction mode is to select for the optimal prediction mode and to perform the prediction determine the compression efficiency, and in order to select the optimal prediction mode, a prediction of the block is performed with respect to every prediction mode and then a cost is calculated using a predetermined cost function to eventually take the prediction mode with the lowest encoding cost.

Therefore, in order to determine the optimal prediction mode whether it is intra_4×4 prediction or intra_16×16 prediction, the cost should be calculated after trying every prediction mode. This makes an encoding process complex and lowers the compression efficiency.

Additionally, to correctly decode the image, information on the selected optimal prediction mode should also be encoded. In response to recent incremental requirements for higher resolution images, the number of blocks to be encoded has been increased resulting in greater quantity of bits required to encode the information on the optimal prediction mode with respect to each block, which degrades the compression efficiency.

DISCLOSURE

Technical Problem

Therefore, the present disclosure has been made in view of the above mentioned problems to provide in one aspect a method and apparatus for determining intra prediction mode with reduced determining procedure for the intra prediction modes thereby achieving improved compression efficiency.

Technical Solution

An aspect of the present disclosure provides a video encoding apparatus including: a prediction mode selector for selecting an intra prediction mode of a current block to be encoded from an input video depending on a variation of a pixel value of a pixel adjacent to the current block; an intra prediction encoder for encoding a residual block generated by performing an intra prediction on the current block in a selected intra prediction mode of the current block from the prediction mode selector to generate a coded coefficient bit; and a bitstream generator for generating and outputting a bitstream including the coded coefficient bit and a prediction mode bit for representing the selected intra prediction mode of the current block by the unit of macroblock or subblock, and having the prediction mode bit included selectively in the bitstream depending on the variation.

Another aspect of the present disclosure provides a video encoding method including: selecting an intra prediction mode of a current block to be encoded from an input video depending on a variation of a pixel value of a pixel adjacent to the current block; encoding a residual block generated by performing an intra prediction on the current block in a selected intra prediction mode of the current block from the selecting to generate a coded coefficient bit; and generating a bitstream including the coded coefficient bit and a prediction mode bit for representing the selected intra prediction mode of the current block by the unit of macroblock or subblock with the prediction mode bit included selectively in the bitstream depending on the variation.

Yet another aspect of the present disclosure provides a video decoding apparatus including: a bitstream extractor for extracting a coded coefficient bit made from encoding a residual block of a current block and a prediction mode bit of the current block from a bitstream including the coded coefficient bit and the prediction mode bit by the unit of macroblock or subblock; a prediction mode selector for selecting a preset intra prediction mode or an intra prediction mode represented by an extracted prediction mode bit from the extracting for use as the intra prediction mode of the current block depending on a variation of a pixel value of a pixel adjacent to the current block; and an intra prediction decoder for decoding the coded coefficient bit to reconstruct the residual block of the current block and for performing an intra prediction on the current block in a selected intra prediction mode of the current block from the prediction mode selector to reconstruct and output the current block.

Yet another aspect of the present disclosure provides a video decoding method including: extracting a coded coefficient bit made from encoding a residual block of a current block and a prediction mode bit of the current block from a bitstream including the coded coefficient bit and the prediction mode bit by the unit of macroblock or subblock;

selecting a preset intra prediction mode or an intra prediction mode represented by an extracted prediction mode bit from the extracting for use as the intra prediction mode of the current block depending on a variation of a pixel value of a pixel adjacent to the current block; decoding the coded coefficient bit to reconstruct the residual block of the current block; performing an intra prediction on the current block in a selected intra prediction mode of the current block from the selecting; and reconstructing and outputting the current block by using a reconstructed residual block from the decoding and the current block from the intra prediction.

Yet another aspect of the present disclosure provides an apparatus for selecting a prediction mode including: a variation calculator for calculating a variation of a pixel value of a pixel adjacent to a current block; a mode selector for selecting a preset intra prediction mode as an intra prediction mode of the current block if a calculated variation from the variation calculator is less than a threshold and for selecting a single intra prediction mode from a plurality of intra prediction modes according to a preset mode selection criterion if the calculated variation is greater than or equal to the threshold so as to determine the single intra prediction mode from the selecting as the intra prediction mode of the current block; and a mode bit generator for generating and outputting a prediction mode bit for representing a selected intra prediction mode of the current block from the mode selector.

Yet another aspect of the present disclosure provides a method for selecting a prediction mode including: calculating a variation of a pixel value of a pixel adjacent to a current block; selecting a preset intra prediction mode as an intra prediction mode of the current block if a calculated variation from the calculating is less than a threshold; selecting a single intra prediction mode from a plurality of intra prediction modes according to a preset mode selection criterion if the calculated variation is greater than or equal to the threshold so as to determine the single intra prediction mode from the selecting as the intra prediction mode of the current block; and generating and outputting a prediction mode bit for representing the intra prediction mode of the current block from the selecting.

Yet another aspect of the present disclosure provides an apparatus for selecting a prediction mode including: a variation calculator for calculating a variation of a pixel value of a pixel adjacent to a current block; and a mode selector responsive to a calculated variation from the variation calculator being less than a threshold for selecting a preset intra prediction mode as an intra prediction mode of the current block and responsive to the variation being greater than or equal to the threshold for determining the intra prediction mode of the current block with a selection of an intra prediction mode represented by a prediction mode bit of the current block extracted from a bitstream including a coded coefficient bit made from encoding a residual block of the current block as well as the prediction mode bit of the current block by the unit of macroblock or subblock.

Yet another aspect of the present disclosure provides a method for selecting a prediction mode including: calculating a variation of a pixel value of a pixel adjacent to a current block; if a calculated variation from the calculating is less than a threshold, selecting a preset intra prediction mode as an intra prediction mode of the current block; and if the variation is greater than or equal to the threshold, determining the intra prediction mode of the current block with a selection of an intra prediction mode represented by a prediction mode bit of the current block extracted from a bitstream including a coded coefficient bit made from encoding a residual block of the current block as well as the prediction mode bit of the current block by the unit of macroblock or subblock.

Advantageous Effects

According to the present disclosure as described above, the process of selecting the prediction mode for compressing the image can be simplified to increase the compression speed and reduce the quantity of the compressed data and thereby improve the compression efficiency.

DESCRIPTION OF DRAWINGS

FIG. 7 is a diagram showing variations of pixel values of adjacent pixels according to an aspect.

MODE FOR INVENTION

Figure 1:
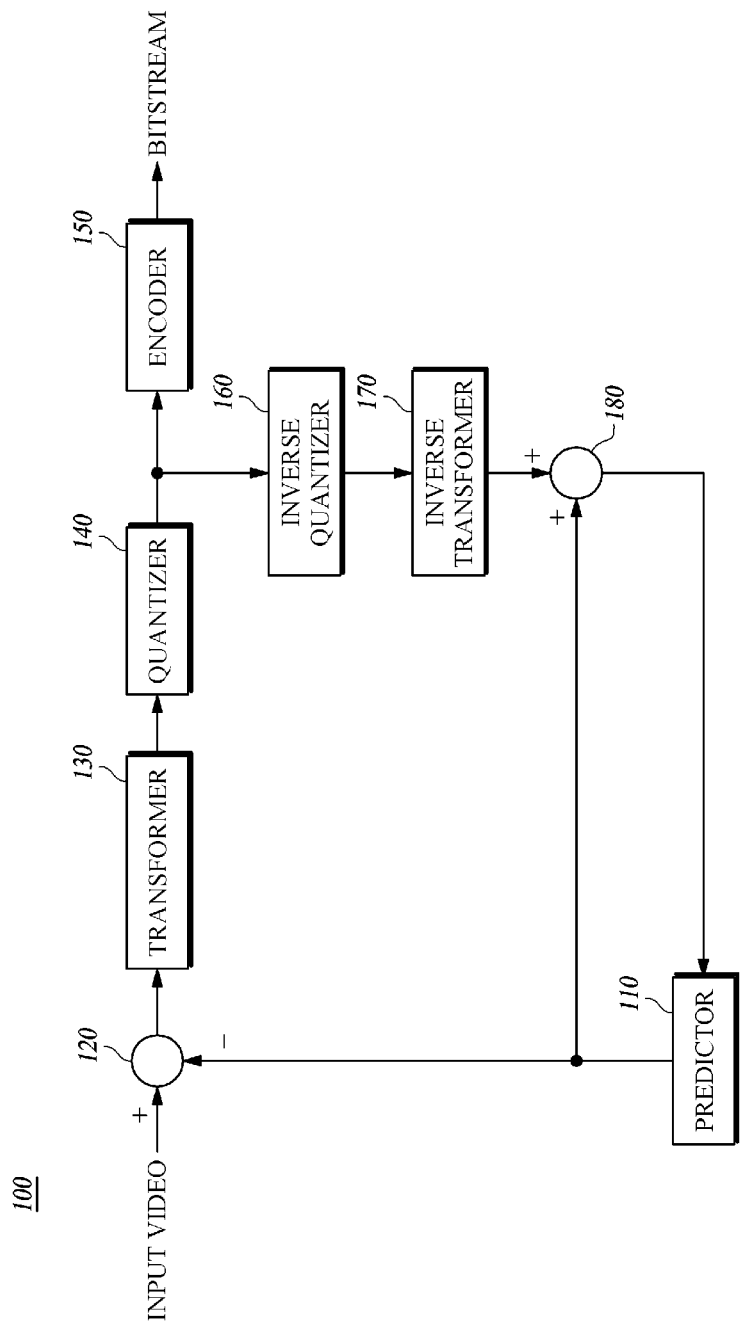
FIG. 1 is a schematic diagram showing a video encoding apparatus.

Hereinafter, aspects of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Additionally, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

A video encoding apparatus, video decoding apparatus, or prediction mode selection apparatus may be a personal computer or PC, notebook or laptop computer, personal digital assistant or PDA, portable multimedia player or PMP, PlayStation Portable or PSP, or mobile communication terminal, smart phone or such devices, and represent a variety of apparatuses equipped with, for example, a communication device such as a modem for carrying out communications between various devices or wired/wireless communication networks, a memory for storing various programs for encoding videos and related data, and a microprocessor for executing the programs to effect operations and controls.

In addition, the video encoded into a bitstream by the video encoding apparatus may be transmitted in real time or non-real-time to the video decoding apparatus for decoding the same where it is reconstructed and reproduced into the video after being transmitted via a wired/wireless communication network including the Internet, a short range wireless communication network, a wireless LAN network, WiBro (Wireless Broadband) also known as WiMax network, and mobile communication network or a communication interface such as cable or USB (universal serial bus).

In addition, although the video encoding apparatus and the video decoding apparatus may be equipped with the functions of performing the inter prediction as well as the intra prediction, which lacks a direct correlation with the aspects of the present disclosure, a detailed description will be provided to avoid any confusions.

A video is typically consisted of a series of pictures which are respectively divided by blocks. Each of the blocks is classified into an intra block or an inter block depending on the method of classification. The intra block means the block that is encoded through an intra prediction coding which is within a current picture where the current encoding is performed for generating a predicted block by predicting a current block using pixels of reconstructed block that underwent previous encoding and decoding and then encoding the differential value of the predicted block from the pixels of the current block. The inter block means the block that is encoded through an inter prediction coding which generates the predicted block by predicting the current block in the current picture through referencing one or more past pictures or future pictures to predict the current block in the current picture and then encoding the differential value of the predicted block from the current block. Here, the picture that is referenced in encoding or decoding the current picture is called a reference picture.

FIG. 1 is a schematic diagram showing a video encoding apparatus 100.

Video encoding apparatus 100 may include a predictor 110, a subtracter 120, a transformer 130, a quantizer 140, an encoder 150, an inverse quantizer 160, an inverse transformer 170, and an adder 180.

Predictor 110 generates a predicted block by performing intra prediction on the current block. In other words, predictor 110 in response to the block to be currently encoded, i.e. current block for predicting the original pixel values of the pixels of the current block in the prediction direction of the intra prediction mode that is selected from a plurality of intra prediction directions to generate and output the predicted block having predicted pixel values.

Here, the plurality of intra prediction modes may be that number of either intra prediction modes depending on the block mode of the current block or intra prediction modes preset by a user. For example, assuming the H.264/AVC standard is complied in compressing a video and the block mode of the current block is the intra_16×16 modes, the plurality of intra prediction modes may be the four intra prediction modes which are the predicted modes of the intra_16×16 modes defined in the H.264/AVC standard. In the same occasion, if the user presets the horizontal mode and the vertical mode out of the four intra prediction modes, the plurality of intra prediction modes may become the horizontal and vertical modes from the intra_16×16 modes.

Subtracter 120 generates a residual block of the current block by subtracting the predicted block from the current block. Here, the outputted residual block includes a residual signal which is the original pixel value subtracted by the predicted pixel value of the predicted block.

Transformer 130 generates a transformed block by transforming the residual block. Specifically, transformer 130 transforms a residual signal of the residual block outputted from subtracter 120 into frequency domain to generate and output the transformed block having a transform coefficient. Here, the method used for transforming the residual signal into the frequency domain may be the discrete cosine transform (DCT) based transform or Hadamard transform among various other unlimited transforming techniques available from improving and modifying the DCT transform or the like, whereby the residual signal is transformed into the frequency domain and into the transform coefficient.

Quantizer 140 quantizes the transformed block to generate a transformed and quantized block. Specifically, quantizer 140 quantizes the transform coefficient of the transformed block outputted from transformer 130 to generate and output the transformed and quantized block having a quantized transform coefficient. Here, the quantizing method used may be the dead zone uniform threshold quantization (DZUTQ) or the quantization weighted matrix among their various improvement options.

Encoder 150 encodes the transformed and quantized block to output a bitstream. In particular, encoder 150 encodes a frequency coefficient string resulted from scanning in the zig-zag scanning or other various scanning methods with respect to the quantized transform coefficient of the transformed and quantized block outputted from quantizer 140, by using various encoding techniques such as the entropy encoding, and generates and outputs the bitstream encompassing additional information needed to decode the involved block such as prediction mode information, quantization parameter, motion vector, etc.

Inverse quantizer 160 inversely quantizes the transformed and quantized block. Specifically, inverse quantizer 160 inversely quantizes and output the quantized transform coefficients of the transformed and quantized block outputted from quantizer 140.

Inverse transformer 170 inversely transforms the transformed and quantized block. Specifically, inverse transformer 170 inversely transforms the inversely quantized transform coefficients from inverse quantizer 160 to reconstruct the residual block having the reconstructed residual coefficients.

Adder 180 adds the inversely transformed and reconstructed residual block from inverse transformer 170 to the predicted block from predictor 110 in order to reconstruct the current block. The reconstructed current block may be transferred to predictor 110 for use in predicting other blocks including the next block or the next picture.

Figure 2:
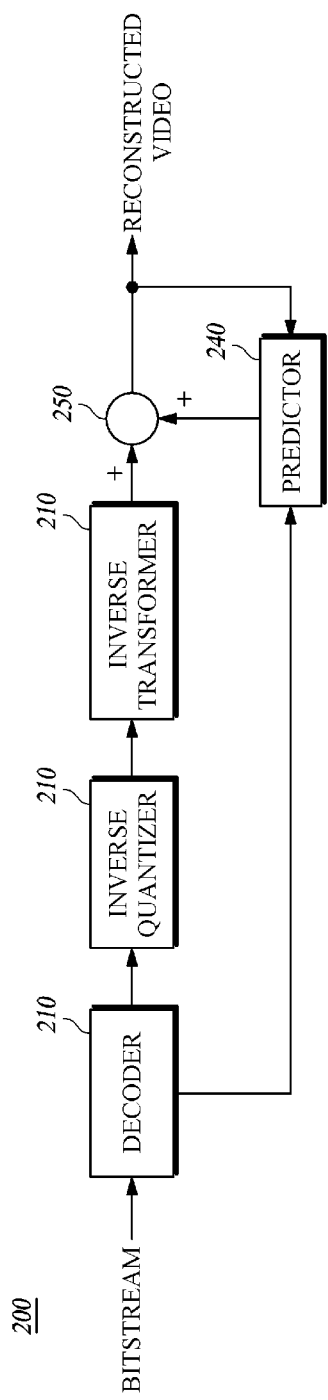
FIG. 2 is a schematic diagram showing a video decoding apparatus.

FIG. 2 is a schematic block diagram of a video decoding apparatus 200.

Video decoding apparatus 200 may include a decoder 210, an inverse quantizer 220, an inverse transformer 230, a predictor 240, and an adder 250.

Decoder 210 decodes a bitstream to extract the transformed and quantized block. Specifically, decoder 210 decodes a bit stream extracted from the bitstream received and inversely scans the result to reconstruct the transformed and quantized block having quantized transform coefficient. At the same time, decoder 210 uses the same encoding technique like the entropy encoding as used by encoder 150 of video encoding apparatus 100 to perform the reconstruction.

Inverse quantizer 220 inversely quantizes the transformed and quantized block. Specifically, inverse quantizer 220 inversely quantizes the quantized transform coefficient of the transformed and quantized block from decoder 210. At this time, inverse quantizer 220 in its operation performs a reversal of the quantization technique used in quantizer 140.

Inverse transformer 230 inversely transforms the transformed and inversely quantized block to reconstruct the residual block. Specifically, inverse transformer 230 reconstructs the inversely quantized transform coefficient of the transformed and inversely quantized block from inverse quantizer 220, wherein inverse transformer 230 in its operation performs a reversal of the transform technique used in transformer 130.

Predictor 240 generates a predicted block by predicting the current block in a prediction direction depending on the intra prediction mode extracted from the bitstream.

Adder 250 adds the reconstructed residual block to the predicted block to reconstruct the current block. Specifically, adder 250 adds reconstructed residual signal of the reconstructed residual block outputted from inverse transformer 230 to the predicted pixel values of the predicted block outputted from predictor 240 to calculate the reconstructed pixel values of the current block, whereby reconstructing the current block.

Figure 3:
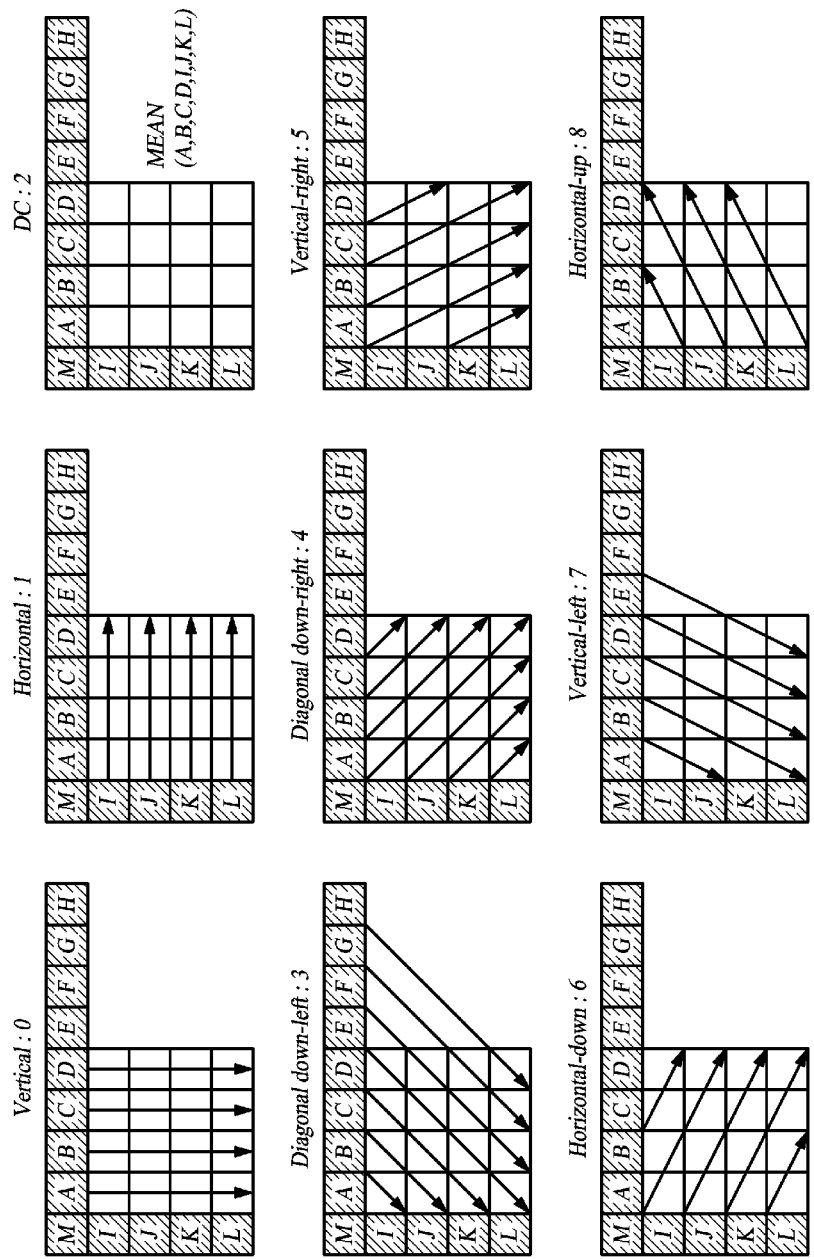
FIG. 3 is a diagram showing nine intra_4×4 prediction modes.
Figure 4:
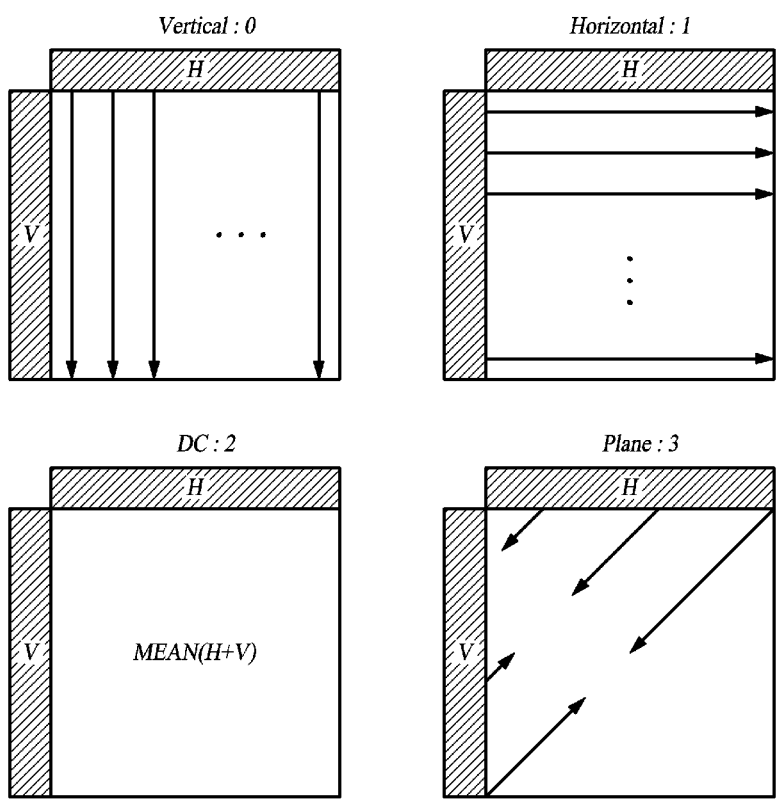
FIG. 4 is a diagram showing four intra_16×16 prediction modes.

Intra predictions by the video encoding apparatus and the video decoding apparatus described with reference to FIGS. 1 and 2 select an optimal intra prediction mode from the plurality of intra prediction modes as illustrated in FIGS. 3 and 4 and predict the block in the prediction direction of the selected optimal intra prediction mode.

FIG. 3 is a diagram showing nine intra_4×4 prediction modes.

Referring to FIG. 3, the intra_4×4 prediction has nine prediction modes comprising a vertical mode, horizontal mode, direct current (DC) mode, diagonal down-left mode, diagonal down-right mode, vertical-right mode, horizontal-down mode, vertical-left mode and horizontal-up mode with the nine prediction modes given mode numbers. The intra_8×8 prediction also has nine prediction modes similar to the intra_4×4 prediction.

FIG. 4 is a diagram showing four intra_16×16 prediction modes.

Referring to FIG. 4, the intra_16×16 prediction has four prediction modes comprising a vertical mode, horizontal mode, DC mode, and plane mode, and the four prediction modes are given mode numbers.

Figure 5:
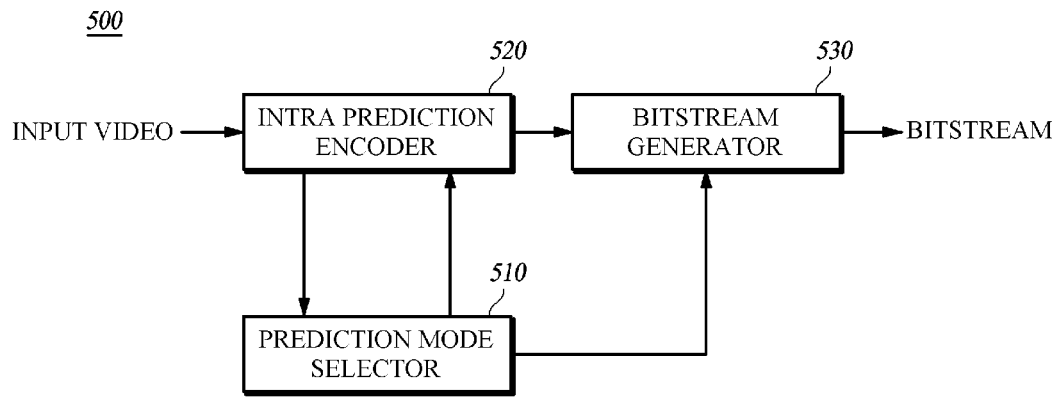
FIG. 5 is a schematic block diagram showing a video encoding apparatus according to an aspect.

FIG. 5 is a block diagram of a video encoding apparatus 500 according to an aspect.

Video encoding apparatus 500 of this aspect may include a prediction mode selector 510, an intra prediction encoder 520, and a bitstream generator 530.

Prediction mode selector 510 is responsive to variation of the pixel value of a pixel adjacent to the current block to be encoded among an input image for selecting the intra prediction mode of the current block. Here, the pixel adjacent to the current block may represent one of the pixels included in neighboring blocks of the current block, and it may specify a pixel adjacent to the current block among the pixels included in the neighboring blocks. In addition, the pixel adjacent to the current block may be a previously reconstructed pixel that went through encoding and decoding by intra prediction encoder 520.

Prediction mode selector 510 may be responsive to the variation of the pixel value of the adjacent pixel being less than a threshold (Th) for selecting a preset intra prediction mode as the intra prediction mode of the current block. Here, the preset intra prediction mode may be such intra prediction mode (e.g. DC mode in H.264/AVC) that predicts the average of the pixel values of the pixels adjacent to the current block as the predicted pixel values of the pixels of the current block.

Prediction mode selector 510 may be responsive to the variation of the pixel value of the pixel adjacent to the current block being greater than or equal to the threshold for selecting one of a plurality of intra prediction modes according to a preset mode selection criterion and then selecting the selected single intra prediction mode as the intra prediction mode of the current block. In this occasion, prediction mode selector 510 may sequentially apply each one of the plurality of intra prediction modes to the preset mode selection criterion for selecting the single intra prediction mode with the DC mode being the last in the plurality of intra prediction modes for application to the preset mode selection criterion. Here, the preset mode selection criterion may be a mode selection criterion prearranged between video encoding apparatus 500 and a video decoding apparatus 900 to be described and is the likes of rate-distortion optimization (RDO), for example.

Prediction mode selector 510 may calculate the variation of the pixel value of the pixel adjacent to the current block by using a degree of scattering. Here, the degree of scattering may be dispersion, standard deviation, mean deviation, and quartile deviation or the like.

Prediction mode selector 510 may compare the variation of the pixel value of the pixel adjacent to the current block against a threshold to select the intra prediction mode of the current block. Here, the threshold may be set according to the quantization coefficient or the quantization step size or the like.

Intra prediction encoder 520 encodes the residual block generated by intra predicting the current block in the selected current block intra prediction mode so as to generate coded coefficient bit. Intra prediction encoder 520 may be configured as video encoding apparatus 100 described above with reference to FIG. 1. In other words, intra prediction encoder 520 may predict the current block according to the intra prediction mode selected by prediction mode selector 510 to generate the current block, subtract the generated residual block from the current block to generate the residual block, and transform and quantize the residual signal of the residual block to generate the quantized frequency coefficients and thereby perform scanning and entropy encoding and the like to generate the encoded coefficient bits. At this time, the transform and/or quantization processes may be selectively omitted depending on implementations.

In addition, the current block may be defined by the unit of macroblock or subblock. Here, the macroblock may be of size 16×16 and the subblock is 4×4 sized among various other unlimited sizes of blocks. For example, the macroblock may be a 16×16, 32×32, 8×8 or such M×N (M, N are integers) sized block and the possibly smaller subblock may be a 16×16, 32×32, 8×8 or such M×N (M, N are integers) sized block.

In addition, intra prediction encoder 520 may perform the intra quantization and the intra transform on the quantized frequency coefficient to reconstruct the current block which is then stored in a storage device such as a memory for a subsequent use in predicting the next block or next picture, and in particular the reconstructed and stored pixels may be delivered to prediction mode selector 510 for use as adjacent blocks to the current block.

Bitstream generator 530 generates and outputs the bitstream including the coded coefficient bit that has been encoded by the unit of macroblock or subblock and a prediction mode bit that represents the intra prediction mode of the selected current block with the prediction mode bit being selectively included in the bitstream depending on the pixel value variations.

In addition, bitstream generator 530 in its bitstream generation may assign the coefficient bit coded by the unit of macroblock or subblock ahead of the prediction mode bit and output such bitstream. However, in the event that bitstream generator 530 includes the coded coefficient bit and the prediction mode bit in the bitstream by the unit of macroblock, it is preferable to have the coded coefficient bit precede the prediction mode bit, and if bitstream generator 530 includes the coded coefficient bit and the prediction mode bit in the bitstream by the unit of subblock, they may be included regardless of the order of arrangement in the bitstream.

In addition, bitstream generator 530 is responsive to the variation of the pixel value of the pixel adjacent to the current block being greater than or equal to the threshold exclusively for generating and outputting the bitstream that includes both the coded coefficient bit of the current block and the prediction mode bit of the current block, and holds the prediction mode bit of the current block from including in the bitstream if the variation of the pixel value of the pixel adjacent to the current block is less than the threshold. Thus, in the case that the variation of the pixel value of the pixel adjacent to the current block is less than the threshold, the bitstream just includes the coded coefficient bit of the current block.

Figure 6:
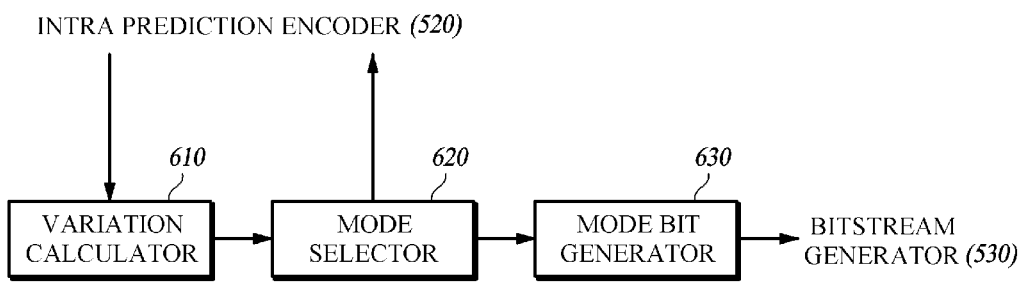
FIG. 6 is a block diagram of a prediction mode determining apparatus according to an aspect.

FIG. 6 is a block diagram of a prediction mode determining apparatus according to an aspect.

The prediction mode determining apparatus for the encoding purpose according to an aspect may be implemented by prediction mode selector 510. For the convenience of description to follow, the prediction mode determining apparatus in the process of encoding of an aspect is called prediction mode selector 510.

Prediction mode selector 510 may include a variation calculator 610 a mode selector 620, and a mode bit generator 630.

Variation calculator 610 calculates the variation of the pixel value of the pixel adjacent to the current block. For example, variation calculator 610 may calculate the variation of the pixel value of the adjacent one in the pixels of the neighboring block of the current block by using a degree of scattering. Here, the degree of scattering may be a statistical indicator for representing dispersion, standard deviation, mean deviation, and quartile deviation or the like. Therefore, the variation of the pixel value of the adjacent pixel may be the indicator as to how close the pixels adjacent of the current block are to each other. The less the variation, the closer the pixels adjacent of the current block are calculated to each other.

For example, if the current block has the size of N×M (N, M are natural numbers) and the mean deviation is used to calculate the variation of the pixel values of the adjacent pixels, variation calculator 610 may calculate the adjacent pixel value variation ($\sigma_p$) using Equation 1.

$$\sigma_P = \sqrt{\left[\sum_{k=0}^{M}(\mu_k - m_u)^2 + \sum_{k=0}^{N}(l_k - m_l)^2\right]\bigg/8} \quad \text{Equation 1}$$

$u_k$: pixel values of the adjacent pixels of number M at the upper location of the current block $l_k$: pixel values of the adjacent pixels of number M at the left side location of the current block $m_u$: an average of $u_k$ $m_l$: an average of $l_k$ Prediction mode selector 620 is responsive to the calculated variation being less than the threshold for selecting the preset intra prediction mode as the intra prediction mode of the current block and is responsive to the calculated variation being greater than or equal to the threshold for selecting an intra prediction mode from a plurality of intra prediction modes according to a preset mode selection criterion determining the intra prediction mode of the current block with and determining the selected one as the intra prediction mode of the current block. In other words, mode selector 620 calculates and properly sets the threshold and compares the variation of the calculated pixel value of the adjacent pixel from variation calculator 610 against the threshold to evaluate the similarity of the adjacent pixels, based on which it selects the intra prediction mode of the current block.

Typical compression technique prescribes that, in selecting the intra prediction mode of the current block, every one of the multiple intra prediction modes undergoes the rate-distortion optimization or other processes to take a single intra prediction mode of the lowest rate-distortion cost as the selected intra prediction mode of the current block. However, if the similarity between the pixels adjacent to the current block is strong, it is effective to dispense with repeatedly carrying out the rate-distortion optimization for every one of the multiple intra prediction modes but simply select such intra prediction mode that has the best prediction efficiency at the high similarity between adjacent pixels, as the intra prediction mode of the current block.

FIG. 7 illustrates at 7A pixels used to predict blocks in the intra_4×4 mode in H.264. Sixteen pixels at a to p represent the current block pixels and thirteen pixels at A to M represent the pixels adjacent to the current block.

To perform the intra prediction of the current block shown at FIG. 7A using the nine prediction modes according to the intra_4×4 mode shown in FIG. 3, predictions are made in nine different directions with the previously compressed and reconstructed A to M pixel values followed by an encoding operation.

For example, to perform the intra prediction in the prediction mode 1 of the horizontal mode in FIG. 3, the first row of current block pixels a, b, c, d is predicted as in Equation 2 below.

$a' = a - 1$ $b' = b - 1$ $$c'=c-1$$

$$d'=d-1 \qquad \text{Equation 2}$$

In addition, to perform the intra prediction in the prediction mode 3 of the diagonal down-left mode in FIG. 3, the first row of the current block pixels a, b, c, d is predicted as in Equation 3 below.

$$a'=a-[(A+2B+C)/4]$$

$$b'=b-[(B+2C+D)/4]$$

$$c'=c-[(C+2D+E)/4]$$

$$d'=d-[(D+2E+F)/4] \qquad \text{Equation 3}$$

Also in the remaining prediction modes, predictions may be similarly performed using the pixel values of the adjacent pixels to produce the residual signals.

However, if all the pixels adjacent to the current block are same as N as shown at FIG. 7B, an intra prediction in the prediction mode 1 of the horizontal direction in FIG. 3 has the first row of pixels a, b, c, d predicted as in Equation 4 below.

$$a'=a-N$$

$$b'=b-N$$

$$c'=c-N$$

$$d'=d-N \qquad \text{Equation 4}$$

In addition, to perform the diagonal left intra prediction in the prediction mode 3 of the diagonal down-left mode in FIG. 3, the first row of the current block pixels a, b, c, d is predicted as in Equation 5 below.

$$a'=a-[(N+2N+N)/4]=a-N$$

$$b'=b-[(N+2N+N)/4]=b-N$$

$$c'=c-[(N+2N+N)/4]=c-N$$

$$d'=d-[(N+2N+N)/4]=d-N \qquad \text{Equation 5}$$

It can be seen through Equation 4 and Equation 5 that, if all the pixels adjacent to the current block have same pixel value, predicting the current block in each and every one of the nine prediction modes for the intra_4×4 mode prediction permits the same result. Therefore, if all the pixels adjacent to the current block have a same pixel value, it would be all right to follow any one prediction mode in performing the intra prediction without deterioration in the prediction performance or compression performance.

Additionally, if the pixels adjacent to the current block were somewhat close to have same pixel value, since the predicted values in the respective prediction directions would be close to one another, the intra prediction may be performed in any one intra prediction mode keeping the prediction performance and compression performance from deteriorated.

In view of this, mode selector 620 may have preset the most efficiently predicting intra prediction mode at the time of a greater similarity between the adjacent pixels, and in response to the variation calculated in variation calculator 610 being less than the threshold with a high similarity concluded between the adjacent pixels, skip the complex process of selecting the intra prediction mode for selecting a preset intra prediction mode as the intra prediction mode of the current block. In this way, the computation volume for selecting the intra prediction mode of the current block may be reduced keeping the intra prediction performance from deteriorated not only to simplify implementation of the system but also shorten the encoding time and thereby improve the compression performance.

Here, the preset intra prediction mode refers to such intra prediction mode as is prearranged between the video encoding apparatus and the video decoding apparatus by which a decoding process is permitted a prediction in the exact same intra prediction mode. The preset intra prediction mode may be, for example, the intra prediction mode such as the DC mode that calls the average of the pixel values of the adjacent pixels as the predicted value among various other unlimited intra prediction modes.

Further, mode selector 620, in response to the variation calculated in variation calculator 610 being greater than or equal to the threshold with a low similarity concluded between adjacent pixels, follows the preset mode selection criterion to select one of the multiple intra prediction modes and determines the selected single intra prediction as the intra prediction mode of the current block.

Here, the preset mode selection criterion refers to a criterion for the video encoding apparatus and video decoding apparatus to select the optimal intra prediction mode for the current block from the multiple intra prediction modes, and it may be set in prearrangement between the video encoding apparatus and video decoding apparatus. An example of the preset mode selection criterion may be the rate-distortion optimization which refers to a technique that involves encoding the current block after predicting the same by each of the multiple intra prediction modes and using a predetermined cost function to calculate the rate-distortion cost (RD cost) and selecting the intra prediction mode with the least rate-distortion cost calculated, as the optimal intra prediction mode.

The mentioned predetermined cost function may be sum of absolute value (SAD), sum of absolute transformed difference (SATD), sum of squared difference (SSD), mean of absolute difference (MAD), Lagrange function and the like. SAD is the sum of absolute values of the residual signals of a 4×4 block. The SATD is the sum of the absolute values of coefficients generated by applying Hadamard transform to the 4×4 block residual signal values. The SSD is the sum of squares of the 4×4 block prediction residual signal values, and the MAD is obtained by averaging the absolute values of the 4×4 block residual signal values. Lagrange function is a cost function obtained by adding length information of the bitstream to a cost function.

In addition, in the event that the variation is greater than or equal to the threshold stipulating the selection of one of the multiple intra prediction modes by the preset mode selection criterion to determine it as the intra prediction mode of the current block, mode selector 620 may change the sequence of applying the multiple intra prediction modes to the preset mode selection criterion. That is, mode selector 620 may apply the multiple intra prediction modes respectively and sequentially to the preset mode selection criterion to determine the single intra prediction mode at which instance the DC mode from the multiple intra prediction modes may be the last applied to the preset mode selection criterion.

This is based on the fact that upon confirming that the variation is greater than or equal to the threshold amounting to large variations of the adjacent pixels, if the DC mode using the average of the adjacent pixel values for the intra predicted values is at the second order of application to the preset mode selection criterion as shown in FIG. 3, then there is less probability that the second order prediction mode is determined to be the optimal prediction mode. That is, the variations are first compared with the threshold and if the variations of the adjacent pixels are greater, there is a low probability that the DC mode is selected as the optimal intra prediction mode for the current block and thus it is effective to have the DC mode placed in the end of the sequence of applying modes to the preset mode selection criterion.

Figure 8:
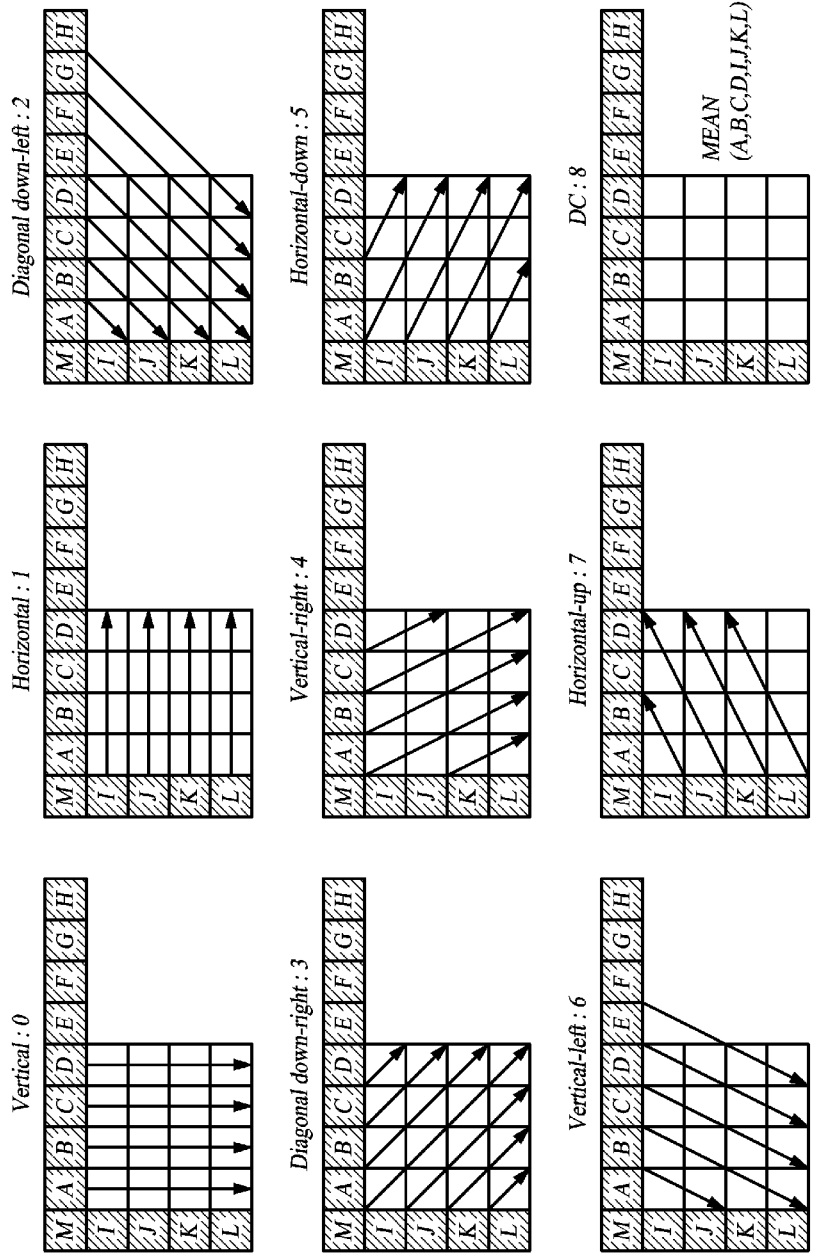
FIG. 8 is a diagram showing nine 4×4 intra prediction modes with the intra prediction sequence changed according to an aspect.

Referring to FIG. 8, of the nine intra prediction modes in the intra_4×4 modes, when the DC mode is reordered from its second mode place to the eighth, it becomes even faster to select the optimal prediction mode for the current block. In this case, the vertical mode, horizontal mode, diagonal down-left mode, diagonal down-right mode, vertical-right mode, horizontal-down mode, vertical-left mode, horizontal-up mode, and DC mode are applied to the preset mode selection criterion in this order so that the selected one optimal mode may be determined to be the intra prediction mode of the current block. To this end, as shown in FIG. 8, with the vertical mode and horizontal mode respectively remained at mode 0 and mode 1, the positional shifts of modes may be such that diagonal down-left mode to number 2, diagonal down-right mode to number 3, vertical-right mode to number 4, horizontal-down mode to number 5, vertical-left mode to number 6, horizontal-up mode to number 7, and DC mode to number 8. Likewise, the order of the four intra predictions in the intra 16×16 modes may be changed so that the DC mode is at the end.

In addition, to compress the current block efficiently, besides the variations of the adjacent pixel values calculated by variation calculator 610, it is necessary to have mode selector 620 properly set the threshold as the reference for evaluating the degree of the similarities between the adjacent pixels as compared with the calculated variations. That is, the threshold is reference information for evaluating the degree of how similar the pixels adjacent to the current block are to each other. Hence, if the calculated variations of the adjacent pixel values are less than the set threshold, the pixels adjacent to the current block may be determined to be highly similar among them. To the contrary, if the calculated variations of the adjacent pixel values are greater than or equal to the set threshold, it may be determined that the pixels adjacent to the current block have lower similarities among them. To this end, mode selector 620 may calculate and set the threshold.

The threshold may be calculated and set adaptively by quantization parameter (QP) and quantization step size ($Q_{step}$). Here, the QP is adapted to control the quantization and it may be set to an arbitrary integer value. For example, in H.264 the QP may set to be one in the range of 0 to 51. $Q_{step}$ is information for controlling the quantization strength and it is set based on the QP. For example, as with H.264 where increasing the QP by six doubles the $Q_{step}$ by nature, the $Q_{step}$ may be controlled into being doubled at the increments of the QP by six in the present disclosure.

The above described threshold may be set using Equation 6.

$$Th = \text{floor}\left(\frac{Q_{step}}{X} - \frac{QP}{Y}\right) \quad \text{Equation 6}$$

floor( ): round function to an integer
$Q_{step}$: quantization step size
QP: quantization parameter
X, Y: constants In other words, the threshold may be set by substituting a particular constant for X in Equation 6 as well as substituting a particular constant for Y. Such constant X and/or constant Y may have their substitute values changed according to the set values of the quantization parameter QP and/or quantization step size $Q_{step}$ or the desired value of the threshold.

Mode bit generator 630 may generate and output a prediction mode bit for representing the intra prediction mode of the current block. At this time, mode bit generator 630 may be responsive to the calculated variation from variation calculator 610 being greater than or equal to the threshold exclusively for generating and outputting the prediction mode bit and responsive to the variation being less than the threshold for skipping the generation of the prediction mode bit. Here, the prediction mode bit may be included in the bitstream along with the coded coefficient bit made from encoding the residual block, and if their inclusion in the bitstream is by the unit of macroblock, the coded coefficient bit may be assigned a place ahead of the prediction mode bit while if the inclusion is by the unit of subblock, the coded coefficient bit and the prediction mode bit may be included in the bitstream regardless of their order of arrangement.

Figure 9:
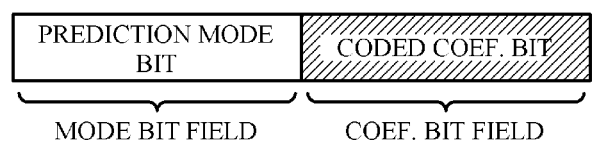
FIG. 9 is a schematic diagram showing a bitstream included by the unit of macroblock composed according to an aspect.
Figure 9:
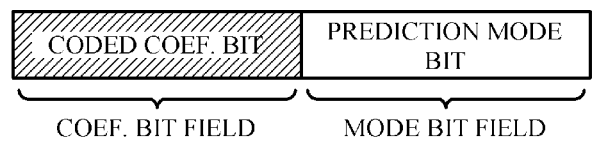

FIG. 9 is a schematic diagram showing a bitstream included by the unit of macroblock composed according to an aspect.

The bitstream may be generated by bitstream generator 530 and be composed as shown in FIG. 9. Illustrated at FIG. 9A is the structure of a bitstream generated by typical compression techniques, and the bitstream generated by the unit of macroblock in an aspect of the present disclosure is structured as at FIG. 9B.

The typically compressed and generated bitstream shown at FIG. 9A has a mode bit field with an assigned prediction mode bit precedes a coefficient bit field with a coded coefficient bit assigned while the generated bitstream by the disclosed aspect shown at FIG. 9B has the mode bit field with the assigned prediction mode bit trails the coefficient bit field with the coded coefficient bit assigned.

The bitstream structure at FIG. 9B illustrates the bitstream structure having the coded coefficient bit and the prediction mode bit generated by the unit of macroblock, wherein the coefficient bit field with the coded coefficient bit assigned may include the coded coefficient bits of all the blocks in macroblock whereas the mode bit field with the prediction mode bit assigned may not include the prediction mode bits of all the blocks in macroblock (or subblock).

If the variations of the pixels adjacent to the current block are less than the threshold, prediction mode selector 510 concludes the adjacent pixels have strong similarities and selects the preset intra prediction mode as the intra prediction mode of the current block, wherein since the preset intra prediction mode is prearranged between the video encoding apparatus and the video decoding apparatus, the bitstream may not necessarily include the prediction mode bit for representing intra prediction mode of the corresponding block for the video decoding apparatus to know that the intra prediction mode of the current block is the preset intra prediction mode in the same method as the video encoding apparatus used. Therefore, in the event that the intra prediction mode of the current block is selected to be the preset intra prediction mode, the prediction mode bit of the corresponding block may not be included in the mode bit field, whereby reducing the quantity of the compressed data to improve the compression performance.

Meanwhile, as shown in FIG. 9, the bitstream generated by the unit of macroblock according to an aspect is structurally different from the bitstream generated by the typical compression technique due to the fact as described above that in response to the selection of the preset intra prediction mode for the intra prediction mode of the current block, the prediction mode bit of the corresponding block is not included in the mode bit field in the bitstream. In the same occasion of selecting the preset intra prediction mode for the intra prediction mode of the current block, keeping the prediction mode bit of the corresponding block from being included in the mode bit field and placing the mode bit field ahead of the coefficient bit field as in the bitstream generated by the typical compression technique will disable the video decoding apparatus in receipt of the bitstream from properly distinguishing between the prediction mode bit and the coefficient bit. Specifically, the video decoding apparatus will not be able to identify the end point of the prediction mode bit and the starting point of the coded coefficient bit.

To solve this problem, an aspect of the disclosure changes the bitstream in its sequence by transmitting the coefficient bit field with the coded coefficient bit assigned ahead of the mode bit field with the prediction mode bit assigned. In this way, the video decoding apparatus can normally extract the coded coefficient bits of the respective blocks in macroblock by the predetermined format for the coded coefficient bit. Then, depending on the variations of the pixel values of the pixels adjacent to the respective blocks, the video decoding apparatus may select between the preset intra prediction mode and an intra prediction mode represented by the prediction mode bit for use as the intra prediction mode of the corresponding block, wherein in response to selecting the preset intra prediction mode as the intra prediction mode of the corresponding block, it may skip extracting the prediction mode bit of the bitstream to use the preset intra prediction mode for intra-predicting the corresponding block, and only in response to selecting the intra prediction mode represented by the prediction mode bit as the intra prediction mode of the corresponding block, it may extract the prediction mode bit from the mode bit field in the bitstream as usual to use the intra prediction mode represented by the corresponding prediction mode bit for intra-predicting the corresponding block normally.

Figure 10:
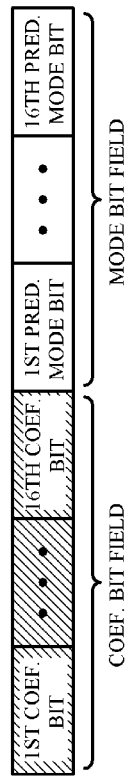
FIG. 10 is a schematic diagram showing a bitstream included by the unit of subblock composed according to an aspect.
Figure 10:
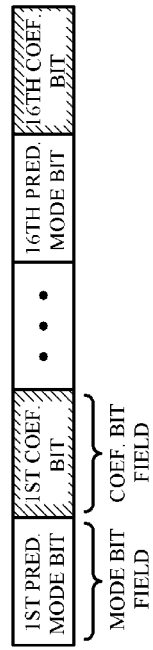
Figure 10:

FIG. 10 is a schematic diagram showing a bitstream included by the unit of subblock composed according to an aspect.

The illustrated structure of the bitstream at FIG. 9B is directed to the coded coefficient bit and the prediction mode bit which are included by the unit of macroblock. Moreover, the bitstream of an aspect may have the coded coefficient bit and the prediction mode bit included by the unit of subblock as shown in FIG. 10.

FIG. 10 shows a structure of bitstream generated by an aspect where the intra prediction encoding is performed on sixteen divisions of 4×4 size of subblocks from a 16×16 size of macroblock where FIG. 10 at 10A represents the structure of the bitstream generated with the coded coefficient bit and the prediction mode bit included by the unit of macroblock, and 10B represents the structure of the bitstream generated with the coded coefficient bit and the prediction mode bit included by the unit of subblock.

When generating the bitstream with the coded coefficient bit and the prediction mode bit included by the unit of macroblock, the coefficient bit field comes to include a first coefficient bit through a sixteenth coefficient bit in series for each of the sixteen 4×4 sized subblocks within the 16×16 sized macroblock as shown at 10A and the mode bit field also includes a first prediction mode bit through a sixteenth prediction mode bit in series for each of the sixteen 4×4 sized subblocks within the 16×16 sized macroblock. Specifically, the coefficient bit fields are included preceding the mode bit fields in the bitstream. Of course, depending on the variations of the pixels adjacent to the respective subblocks, the first through sixteenth prediction mode bits in part or their entirety may be selectively included in the bitstream.

On the other hand, when generating the bitstream with the coded coefficient bit and the prediction mode bit included by the unit of subblock, a first pair of a coefficient bit field and a mode bit field is placed for a subblock and followed by a second pair of a coefficient bit field and a mode bit field for the next subblock and so on in the structure for the respective sixteen 4×4 sized subblocks within the 16×16 sized macroblock as shown at 10B. In this way, a first coefficient bit is followed by a first prediction mode bit and then a second coefficient bit is followed by a second prediction mode bit and so on until a sixteenth coefficient bit is followed by a sixteenth prediction mode bit. In addition, as described above, the prediction mode bit is included in the bitstream depending on the variation of the pixel value of the pixel adjacent to the current block. Therefore, the bitstream shown at 10B represents the inclusion of the prediction mode bits of the entire sixteen subblocks in the 4×4 size within the 16×16 sized macroblock.

However, for example, upon determining the preselected intra prediction mode as the intra prediction mode of the corresponding subblock as the threshold is not exceeded by the variations of the pixel values of pixels adjacent to the second and third subblocks among the sixteen 4×4 sized subblocks of the first through sixteenth subblocks in the 16×16 sized macroblock, the corresponding subblocks that are the second and third subblocks have their prediction mode bits neither generated nor assigned for inclusion in the bitstream. This occasion is illustrated at FIG. 10C.

Meanwhile, the assignment of the prediction mode bit by the unit of subblock ahead of the coded coefficient bit as described and illustrated at FIG. 10B and FIG. 10C may work well in the reverse order. That is, the coded coefficient bit may be assigned to precede the prediction mode bit in the constitution of the bitstream. The reason for this is that when the bitstream is generated with the coded coefficient bit and the prediction mode bit included by the unit of subblock, the video decoding apparatus could take an advance step of comparing the variation of the pixel adjacent to the subblock to be encoded against the threshold in order to determine whether a prediction mode bit is generated for the corresponding subblock and included in the bitstream. For example, when the video decoding apparatus responds to its decoding arbitrary subblock's adjacent pixel having the pixel value with a variation under the threshold by determining the prediction mode bit of the corresponding subblock is not included in the bitstream, it just extracts and reads in the coded coefficient bit of the corresponding subblock from the bitstream to decode the corresponding subblock, and when the following subblock's adjacent pixel value has a variation being greater than or equal to the threshold so that the video decoding apparatus determines the prediction mode bit of the corresponding subblock is included in the bitstream, it extracts not only the coded coefficient bit but also the prediction mode bit of the corresponding subblock from the bitstream to decode the corresponding subblock, whereby decoding the macroblock.

In constituting the bitstream by including the coded coefficient bit and the prediction mode bit by the unit of macroblock as shown in FIG. 9 at B or FIG. 10 at A, the video decoding apparatus for receiving and decoding the bitstream needs to store the coded coefficient bit and the prediction mode bit for the sixteen subblocks respectively in a memory such as a buffer until the corresponding macroblock is completely decoded, which increases the requisite memory capacity. Also described in the case of constituting the bitstream by including the coded coefficient bit by the unit of macroblock and the prediction mode bit is that the bitstream is prescribed to include the coefficient bit field with the coded coefficient bit assigned ahead of the mode bit field with the prediction mode bit assigned, which makes the construction of the bitstream inflexible.

However, in constituting the bitstream by including the coded coefficient bit and the prediction mode bit by the unit of subblock as shown in FIG. 10 at B and C, as the video decoding apparatus for receiving and decoding the bitstream may read and decode the coded coefficient bit and the prediction mode bit by the unit of subblock and delete the coded coefficient bit and the prediction mode bit for the decoded subblock, the requisite memory capacity may be reduced. Additionally, in constituting the bitstream by including the coded coefficient bit and the prediction mode bit by the unit of subblock, the assigning of the coded coefficient bit and the prediction mode bit for the respective subblocks may be performed regardless of their orders to constitute the bitstream, which makes the construction of the bitstream flexible.

Figure 11:
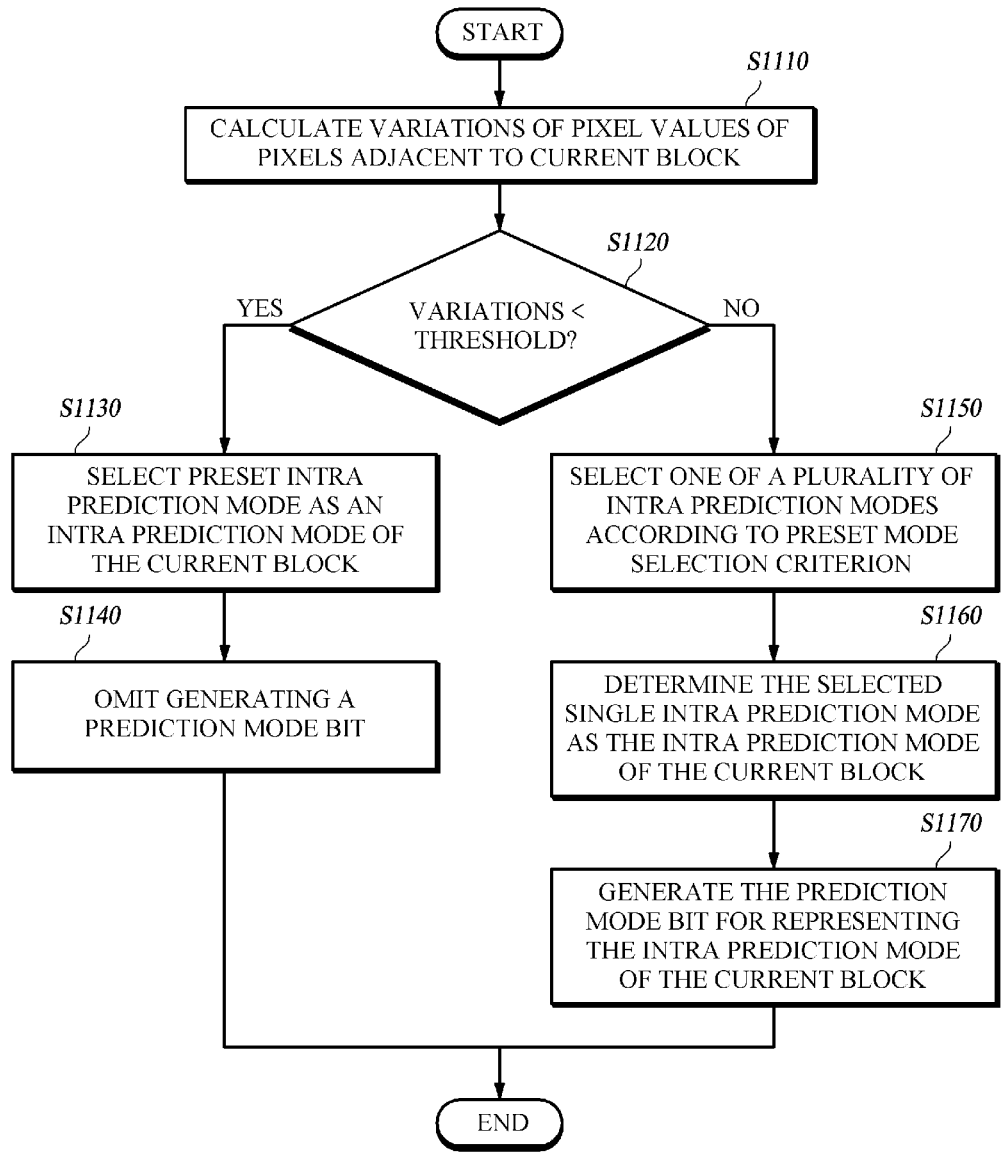
FIG. 11 is a flow diagram showing a prediction mode selection method for encoding according to an aspect.

FIG. 11 is a flow diagram showing a prediction mode selection method for encoding according to an aspect.

To perform an intra prediction on the current block, the intra prediction mode of the current block must be selected. For this purpose, the prediction mode selection apparatus or prediction mode selector 510 calculates the variations of the pixel values of the pixels adjacent to the current block in step S1110, and compares the variations to a threshold instep S1120.

In response to the comparison in step S1120 that the variations are less than the threshold, prediction mode selector 510 determines high similarities of the pixels adjacent to the current block and selects a preset intra prediction mode as an intra prediction mode of the current block in step S1130. At this time, since the preset intra prediction mode as selected for the intra prediction mode of the current block has been known to the video decoding apparatus from a prearrangement, prediction mode selector 510 is exempted from generating the prediction mode bit for representing the intra prediction mode of the current block in step S1140. Even if the prediction mode bit were generated, it is not included in the bitstream.

In addition, if the comparison in step S1120 finds that the variation is greater than or equal to the threshold, prediction mode selector 510 determines low similarities of the pixels adjacent to the current block and selects one of a plurality of intra prediction modes according to a preset mode selection criterion in step S1150, determines the selected single intra prediction mode as the intra prediction mode of the current block in step S1160, and generates a prediction mode bit for representing the intra prediction mode of the current block in step S1170. The generated prediction mode bit is included in the bitstream.

As described, according to an aspect, prediction mode selector 510 in selecting the intra prediction mode of the current block may respond to certain condition (as with the variation of the adjacent pixel value being less than the threshold) for skipping the complex procedure of selecting an optimal intra prediction mode by all the selection criteria including the rate-distortion optimization to select the preset intra prediction mode as the intra prediction mode of the current block whereby reducing the calculation amount and improving the compression performance.

Figure 12:
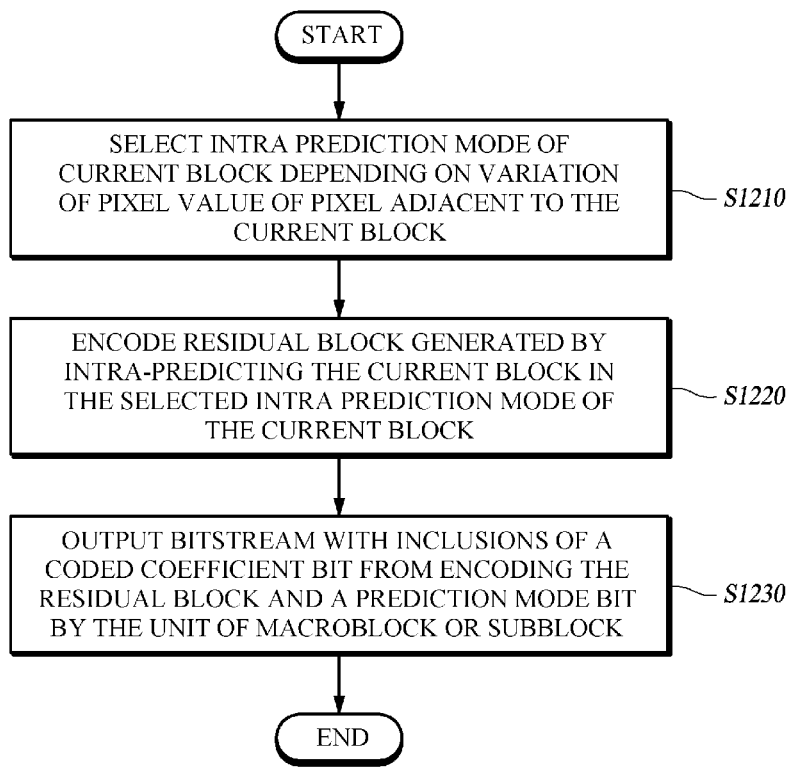
FIG. 12 is a flow diagram showing a video encoding method according to an aspect.

FIG. 12 is a flow diagram showing a video encoding method according to an aspect.

In encoding an input video by the unit of macroblock or subblock such as 32×32 sized block, 16×16 sized block, 8×8 sized block, 4×4 sized block, etc, video encoding apparatus 500 selects an intra prediction mode of a current block to be encoded currently depending on a variation of a pixel value of a pixel adjacent to the current block in step S1210, encodes a residual block generated by performing an intra prediction on the current block in the selected intra prediction mode of the current block in step S1220, and outputs a bitstream with inclusions of a coded coefficient bit from encoding the residual block of the current block and a prediction mode bit by the unit of macroblock or subblock with the prediction mode bit included selectively in the bitstream depending on the variation in step S1230. At this time, the bitstream outputted may include a coefficient bit field with the coded coefficient bit assigned and a mode bit field with the prediction mode bit assigned wherein the inclusion of the coded coefficient bit and the prediction mode bit by the unit of macroblock prescribes the coefficient bit field to be ahead of the mode bit field while the inclusion of the same bits by the unit of subblock lets their fields in the bitstream irrespectively of the order.

Further, when the coded coefficient bits and the prediction mode bits are included by the unit of subblock, the coded coefficient bit of a first subblock may precede the prediction mode bit of the first subblock and then the coded coefficient bit of a second subblock may precede the prediction mode bit of the second subblock and so on throughout the coded coefficient bits and the prediction mode bits of the entire subblocks, which may be the way of the bits to be included in the bitstream.

In this way, not only may an aspect of the disclosure take the variation of the pixel value of the pixel adjacent to the current block into consideration for selecting the intra prediction mode of the current block to reduce the calculation amount for the intra prediction mode selection and save the time for the selection towards improvements of the coding efficiency and the compression efficiency but also be responsive to the variation of the pixel value of the pixel adjacent to the current block for having the prediction mode bit either included or not in the bitstream, whereby reducing the data amount of the bitstream and improving the compression efficiency.

Figure 13:
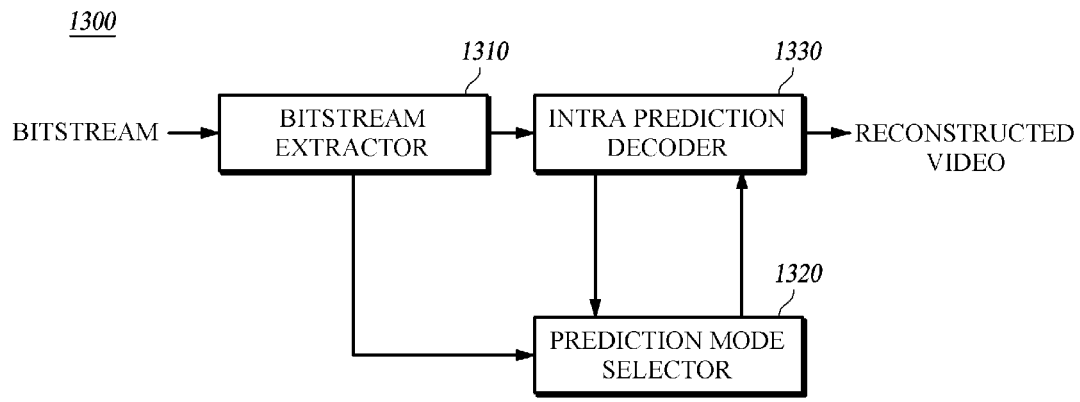
FIG. 13 is a flow diagram showing a video decoding apparatus according to an aspect.

FIG. 13 is a flow diagram showing a video decoding apparatus 1300 according to an aspect.

Video decoding apparatus 1300 may include a bitstream extractor 1310, a prediction mode selector 1320, and an intra prediction decoder 1330.

Bitstream extractor 1310 extracts coded coefficient bits and prediction mode bits from a bitstream which includes the coded coefficient bit from coding the residual block of the current block and the prediction mode bit of the current block by the unit of macroblock or subblock. Here, if the inclusion of the coded coefficient bit and the prediction mode bit is by the unit of macroblock, the coded coefficient bit is included preceding the prediction mode bit.

Prediction mode selector 1320 is responsive to the variation of the pixel value of the pixel adjacent to the current block for selecting a preset intra prediction mode or an intra prediction mode represented by the extracted prediction mode bit as the intra prediction mode of the current block. For example, in response to the variation of the pixel value of the pixel adjacent to the current block being less than a threshold, prediction mode selector 1320 may select the preset intra prediction mode as the intra prediction mode of the current block, and in response to the variation of the pixel value of the pixel adjacent to the current block being greater than or equal to a threshold, it may select the intra prediction mode represented by the prediction mode bit extracted from the bitstream as the intra prediction mode of the current block.

Here, the preset intra prediction mode may be such intra prediction mode that predicts the average value of the pixel values of the pixels adjacent to the current block but it is not limited to be any other intra prediction modes under prearrangement with video encoding apparatus 500. The variation may be calculated by using a degree of scattering which may be dispersion, standard deviation, mean deviation, and quartile deviation or the like. The threshold may be set by the quantization parameter and the quantization step size of the current block.

Intra prediction decoder 1330 decodes the coded coefficient bit to reconstruct the residual block of the current block and intra-predicts the current block in the selected intra prediction mode of the current block to reconstruct and output the current block. Such intra prediction decoder 1330 may be configured as video decoding apparatus 200 described in FIG. 2. Specifically, intra prediction decoder 1330 decodes the coded coefficient bit extracted from the bitstream to reconstruct the quantized transformed block having the quantized transform coefficient, performs an inverse quantization and inverse transform on the quantized transform coefficient to reconstruct the residual block, and predicts the current block in the selected intra prediction mode of the current block from prediction mode selector 1320 to generate a predicted block and then add the predicted block to the reconstructed residual block so as to reconstruct the current block. At this time, the inverse quantization and/or the inverse transform may be selectively omitted depending on the manner of implementation of the disclosure.

Figure 14:
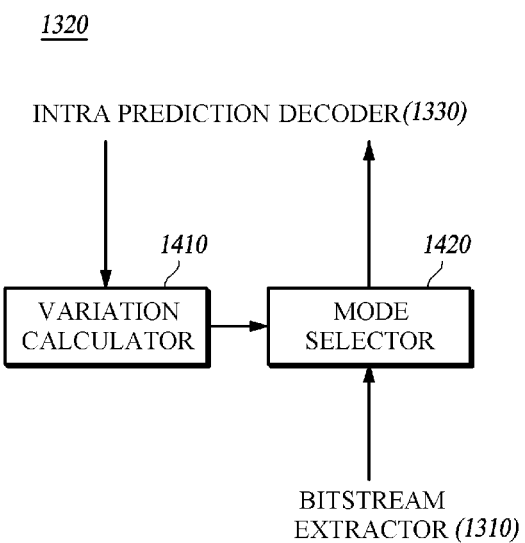
FIG. 14 is a schematic block diagram showing a prediction mode selection apparatus for decoding according to an aspect.

FIG. 14 is a schematic block diagram showing a prediction mode selection apparatus for decoding according to an aspect.

The prediction mode selection apparatus for the decoding operation may be implemented in FIG. 13 by prediction mode selector 1310. In the following description, the prediction mode selection apparatus for decoding is conveniently called prediction mode selector 1310.

Prediction mode selector 1310 may include a variation calculator 1410 and a mode selector 1420.

Variation calculator 1410 calculates the variation of the pixel value of the pixel adjacent to the current block. Such variation calculator 1410 is functionally same or similar to variation calculator 610 described using FIG. 6 and the detailed description is saved from repetition. However, variation calculator 610 in FIG. 6 receives the pixel value of the pixel adjacent to the current block delivered from intra prediction encoder 520 while variation calculator 1410 may receive the same delivered from intra prediction decoder 1330.

Mode selector 1420 is responsive to the calculated variation being less than the threshold for selecting the preset intra prediction mode as the intra prediction mode of the current block and is responsive to the variation being greater than or equal to the threshold for determining the intra prediction mode of the current block with a selection of the intra prediction mode that is represented by the prediction mode bit extracted from the bitstream including the coded coefficient bit made from coding the residual block of the current block and the prediction mode bit of the current block by the unit of macroblock or subblock.

In other words, if the calculated variation from variation calculator 1410 is less than the threshold, mode selector 1420 determines the adjacent pixels have high similarities and selects the preset intra prediction mode in prearrangement with video encoding apparatus 500 as the intra prediction mode of the current block. In addition, if the calculated variation from variation calculator 1410 is greater than or equal to the threshold, mode selector 1420 determines the adjacent pixels have low similarities and reads the prediction mode bit extracted from the bitstream to select the intra prediction mode that is represented by the same prediction mode bit for use as the intra prediction mode of the current block. The selected intra prediction mode of the current block in this way is delivered to intra prediction decoder 1330 for being used to predict the current block.

Figure 15:
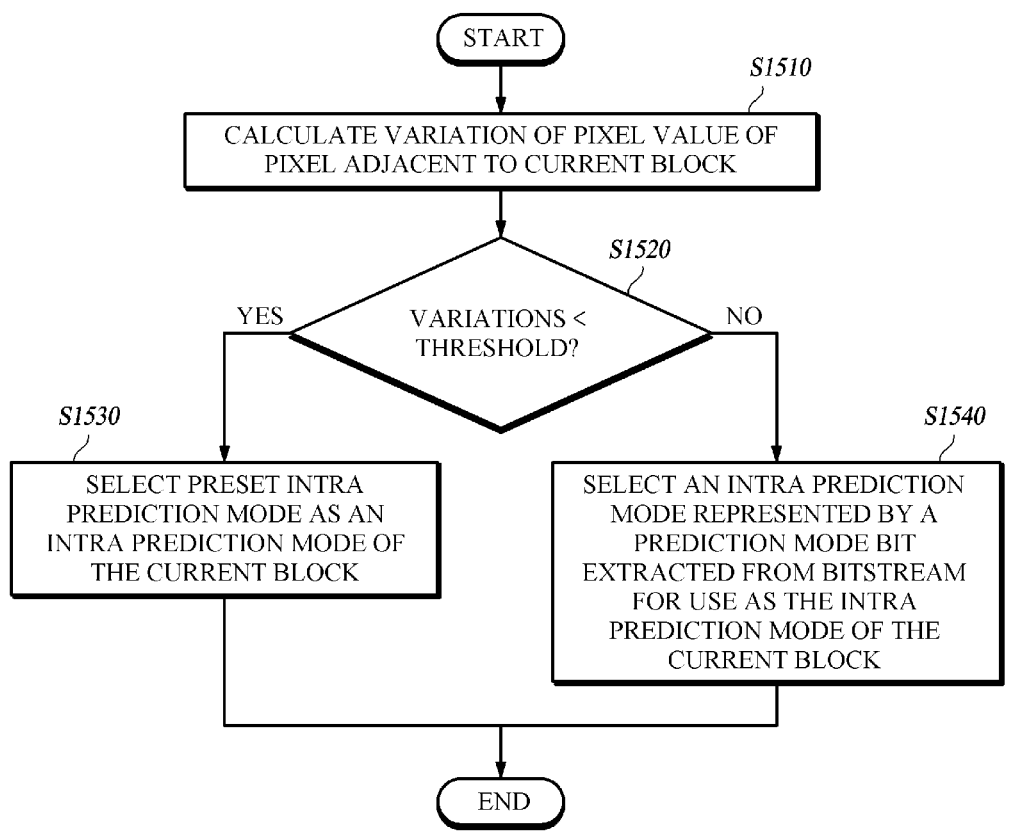
FIG. 15 is a flow diagram showing a prediction mode selection method for decoding according to an aspect.

FIG. 15 is a flow diagram showing a prediction mode selection method for decoding according to an aspect.

In order to select the intra prediction mode of the current block, the prediction mode selection apparatus, i.e. prediction mode selector 1320 of video decoding apparatus 1300 calculates the variation of the pixel value of the pixel adjacent to the current block in step S1510 and compares the calculated variation to a threshold in step S1520.

If the comparison in step S1520 finds the calculated variation being less than the threshold, prediction mode selector 1320 selects a preset intra prediction mode as an intra prediction mode of the current block in step S1530. At this time, the preset intra prediction mode refers to the intra prediction mode set in prearrangement with video encoding apparatus 500.

If the comparison in step S1520 finds the calculated variation being greater than or equal to the threshold, prediction mode selector 1320 selects an intra prediction mode that is represented by a prediction mode bit extracted from the bitstream for use as the intra prediction mode of the current block in step S1540.

Figure 16:
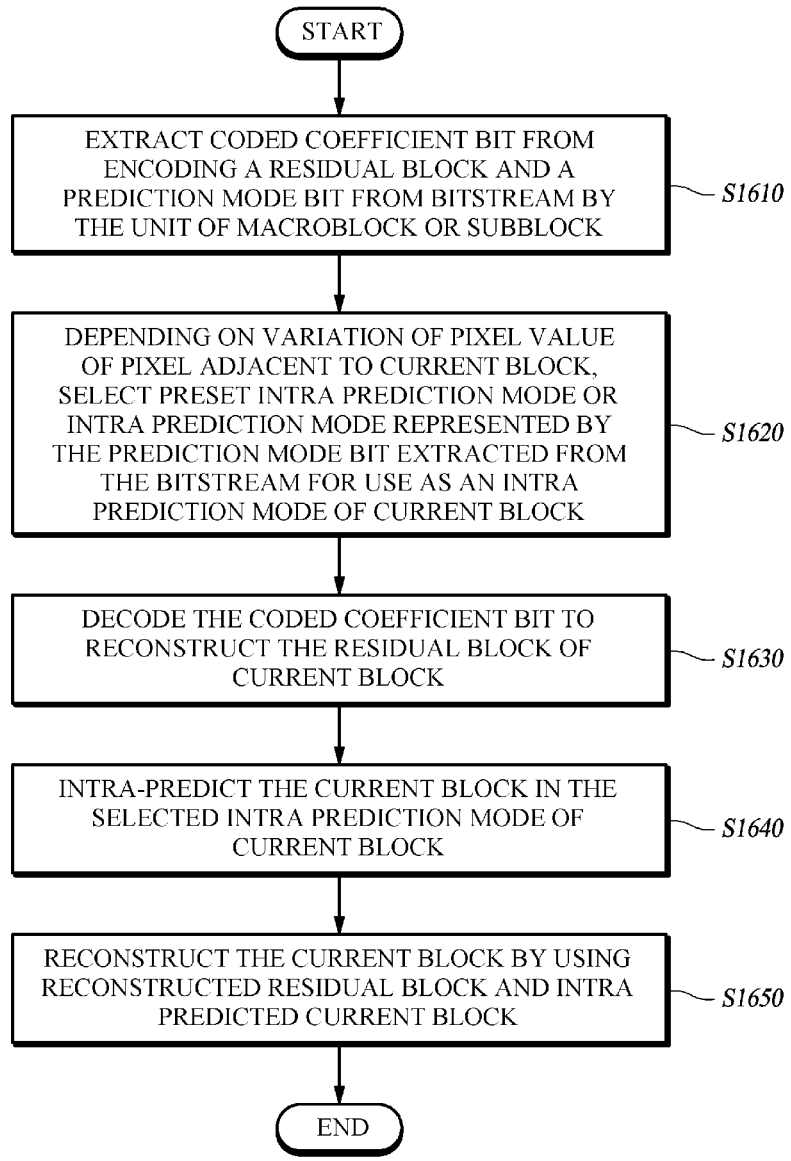
FIG. 16 is a flow diagram showing a video decoding method according to an aspect.

FIG. 16 is a flow diagram showing a video decoding method according to an aspect.

Video decoding apparatus 1300 extracts a coded coefficient bit from encoding a residual block and a prediction mode bit from a bitstream by the unit of macroblock in step S1610, and depending on the variation of the pixel value of the pixel adjacent to the current block, selects a preset intra prediction mode or an intra prediction mode that is represented by the prediction mode bit extracted from the bitstream for use as the intra prediction mode of the current block in step S1620.

Video decoding apparatus 1300 decodes the coded coefficient bit extracted from the bitstream in step S1610 to reconstruct the residual block of the current block in step S1630, predicts the current block in the selected intra prediction mode of the current block from step S1620 in step S1640, and reconstructs the current block by using the reconstructed residual block and the intra predicted current block in step S1650.

For example, assuming a 16×16 sized macroblock was subjected to an intra prediction encoding by the unit of 4×4 sized subblock and the coded coefficient bits and the prediction mode bits for the respective subblocks were incorporated by the unit of macroblock towards the generation of the bitstream, the bitstream includes the coded coefficient bits for all the subblocks on coefficient bit fields, and selectively includes the prediction mode bits for the respective subblocks on mode bit fields depending on the variations of the pixel values of the adjacent pixels, as shown in FIG. 10 at A. In this case, video decoding apparatus 1300 extracts the coded coefficient bits and the prediction mode bits for all the subblocks from the bitstream by the unit of macroblock and stores the extracts in a memory such as a buffer, and reads in the stored coded coefficient bits of the respective subblocks in the memory, and in particular video decoding apparatus 1300 can read in the coded coefficient bits of the respective subblocks correctly thanks to the inclusion of the extracted coded coefficient bits of the respective subblocks from the bitstream ahead of the prediction mode bits of the respective subblocks.

In addition, video decoding apparatus 1300 reads in the prediction mode bits for the respective subblocks that are selectively included depending on the variation of the pixels adjacent to the current block out of the prediction mode bits that are extracted from the bitstream and stored in the memory and selects the intra prediction modes of the respective subblocks depending on the variations of the pixel values of the pixels adjacent to the respective subblocks and predicts the respective subblocks in the selected intra prediction modes of the respective subblocks, and reconstructs the respective subblocks by using residual blocks of the respective subblocks reconstructed from decoding the coded coefficient bits for the respective subblocks and thereby reconstructs the macroblock in its entirety.

In addition, video decoding apparatus 1300 may calculate the variation of the pixels adjacent to the current block, and in response to the calculated variation being less than a threshold, skip reading the prediction mode bit that is extracted from the bitstream and stored in the memory and select a preset intra prediction mode as the intra prediction mode of the current block, and in response to the calculated variation being greater than or equal to the threshold, video decoding apparatus 1300 may read the prediction mode bit that is extracted from the bitstream and stored in the memory and select an intra prediction mode that is represented by the prediction mode bit read in for use as the intra prediction mode of the current block.

For another example, assuming a 16×16 sized macroblock was subjected to an intra prediction encoding by the unit of 4×4 sized subblock and the coded coefficient bits and the prediction mode bits for the respective subblocks were incorporated by the unit of subblock towards the generation of the bitstream, the bitstream has coefficient bit fields and mode bit fields divided by the unit of subblock and includes the coded coefficient bits for the respective subblocks on the coefficient bit fields, and selectively includes the prediction mode bits for the respective subblocks on the mode bit fields depending on the variations of the pixel values of the adjacent pixels, as shown in FIG. 10 at B or C. In this case, video decoding apparatus 1300 extracts the coded coefficient bits and the prediction mode bits for the respective subblocks from the bitstream by the unit of macroblock and stores the extracts in a memory such as a buffer, and either decodes the coded coefficient bits of the respective subblocks stored in the memory by the subblock unit or uses the same in selecting the intra prediction mode of the respective subblocks depending on the variations of the pixel values of the pixels adjacent to the respective subblocks. Video decoding apparatus 1300 can take advantage of the coded coefficient bits and the prediction mode bits it reads in from the memory by the subblock unit to correctly do so regardless of their order. In other words, when reading in the coded coefficient bits and the prediction mode bits from the memory by the subblock unit, video decoding apparatus 1300 may first calculate the variations of the pixel values of the pixels adjacent to the respective subblocks to compare thereof with the threshold and be capable of determining whether the prediction mode bit is included and thus the coded coefficient bits of the respective subblocks placed ahead of the prediction mode bits will have no interference on correctly determining the extensions of the coded coefficient bits towards their correct readings according to the disclosure.

In addition, video decoding apparatus 1300 may set one of the respective subblocks as the current block to be currently decoded, calculate the variation of the pixel value of the pixel adjacent to the current block, and in response to the calculated variation being less than the threshold, skip reading the prediction mode bit that is extracted from the bitstream and stored in the memory and select the preset intra prediction mode as the intra prediction mode of the current block, and in response to the calculated variation being greater than or equal to the threshold, video decoding apparatus 1300 may select the intra prediction mode that is represented by the prediction mode bit extracted from the bitstream and stored in the memory for use as the intra prediction mode of the current block. The selected intra prediction mode in this way is used to predict the current block and the coded coefficient bit for the current block is decoded to reconstruct the current block and then the described procedure is repeated with the next subblock set as the current block. At this time, the coded coefficient bits and the prediction mode bits upon completion of the reconstruction process may be deleted from the memory such as the buffer, whereby the memory capacity requirement in the system may be relieved.

In the description above, although all of the components of the aspects of the present disclosure may have been explained as assembled or operatively connected as a unit, the present disclosure is not intended to limit itself to such aspects. Rather, within the objective scope of the present disclosure, the respective components may be selectively and operatively combined in any numbers. Also, every one of the components may be implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the aspects of the present disclosure. As the computer readable media, the candidates include magnetic recording media, optical recording media, and carrier wave media.

Also, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary aspects of the present disclosure have been described for illustrative purposes, those skilled in the art will appreciate that various modifications, additions and substitutions are possible, without departing from the scope and spirit of the disclosure. Therefore, exemplary aspects of the present disclosure have not been described for limiting purposes. Accordingly, the scope of the disclosure is not to be limited by the above aspects but by the claims and the equivalents thereof.

INDUSTRIAL APPLICABILITY

As described above, the present disclosure is applicable to the video processing field for compressing and transmitting videos and then decompressing and displaying the same in order to simplify the prediction mode selection process for the video compression to improve the compression speed and reduce the quantity of the compressed data and thereby improve the compression efficiency with very useful effect provided.

The invention claimed is:

1. A video encoding apparatus for predicting a current block in a current frame by using an intra prediction in which the current block is predicted from one or more of first pixels in one or more of neighboring blocks located in the same current frame, comprising:
   a prediction mode selector configured to select an intra prediction mode of the current block depending on a pixel value variation of second pixels in the neighboring blocks, the second pixels in the neighboring blocks being located in the same current frame and adjacent to the current block, wherein the intra prediction mode indicates a prediction direction selected from a plurality of intra prediction directions to generate a predicted block of the current block when the intra prediction on the current block is performed, and wherein the second pixels to derive the pixel value variation thereof are selected in the neighboring blocks irrespective of the intra prediction mode of the current block, whereas the first pixels are selected in the neighboring blocks according to the intra prediction mode of the current block;
   an intra prediction encoder configured to encode a residual block, the residual block being generated by performing the intra prediction on the current block from the pixels in the neighboring blocks located in the same current frame according to the selected intra prediction mode of the current block; and
   a bitstream generator configured to generate a bitstream including (i) coded coefficient information of the residual block and (ii) prediction mode information, the prediction mode information representing the selected intra prediction mode of the current block by the unit of the current block or subblocks thereof, the prediction mode information being selectively encoded in the bitstream depending on the pixel value variation of the second pixels in the neighboring blocks,
   wherein, a preset intra prediction mode is selected as the intra prediction mode of the current block and the prediction mode information is not encoded into the bitstream, when the pixel value variation is smaller than a threshold, and
   the prediction mode information is encoded into the bitstream, when the pixel value variation is greater than the threshold.

2. The video encoding apparatus of claim 1, wherein the bitstream generator is configured to generate the bitstream with the coded coefficient information assigned to be ahead of the prediction mode information when the coded coefficient information and the prediction mode information are included by the unit of the current block or subblocks thereof.

3. The video encoding apparatus of claim 1, wherein the intra prediction mode is an intra prediction mode for predicting an average value of pixel values of the pixels adjacent to the current block as predicted pixel values of pixels of the current block.

4. The video encoding apparatus of claim 1, wherein the prediction mode selector is configured to
   select a single intra prediction mode from a plurality of intra prediction modes according to a preset mode selection criterion when the pixel value variation is greater than the threshold, and
   determine the single intra prediction mode as the intra prediction mode of the current block.

5. The video encoding apparatus of claim 4, wherein the prediction mode selector is configured to sequentially apply each one of the plurality of intra prediction modes to the preset mode selection criterion for selecting the single intra prediction mode with a DC mode being the last in the plurality of intra prediction modes to be applied to the preset mode selection criterion.

6. The video encoding apparatus of claim 1, wherein the prediction mode selector is configured to calculate the pixel value variation by using a degree of scattering selected from the group consisting of a dispersion, a standard deviation, a mean deviation, and a quartile deviation.

7. The video encoding apparatus of claim 1, wherein the prediction mode selector is configured to compare the pixel value variation against the threshold to select the intra prediction mode of the current block, the threshold being set according to a quantization coefficient and a quantization step size of the current block.

8. A video encoding method for predicting a current block in a current frame by using an intra prediction in which the current block is predicted from one or more of first pixels in one or more of neighboring blocks located in the same current frame, comprising:
   selecting an intra prediction mode of the current block depending on a pixel value variation of second pixels in the neighboring blocks, the second pixels in the neighboring blocks being located in the same current frame and adjacent to the current block, wherein the intra prediction mode indicates a prediction direction selected from a plurality of intra prediction directions to generate a predicted block of the current block when the intra prediction on the current block is performed, and wherein the second pixels to derive the pixel value variation thereof are selected in the neighboring blocks irrespective of the intra prediction mode of the current block, whereas the first pixels are selected in the neighboring blocks according to the intra prediction mode of the current block;
   encoding a residual block, the residual block being generated by performing the intra prediction on the current block from the pixels in the neighboring blocks located in the same current frame according to the selected intra prediction mode of the current block; and
   generating a bitstream including (i) coded coefficient information of the residual block and (ii) prediction mode information, the prediction mode information representing the selected intra prediction mode of the current block by the unit of the current block or subblocks thereof, the prediction mode information being selectively encoded in the bitstream depending on the pixel value variation of the second pixels in the neighboring blocks,
   wherein a preset intra prediction mode is selected as the intra prediction mode of the current block and the prediction mode information is not encoded into the bitstream, when the pixel value variation is smaller than a threshold, and the prediction mode information is encoded into the bitstream, when the pixel value variation is greater than the threshold.

9. A video decoding apparatus for predicting a current block in a current frame by using an intra prediction in which the current block is predicted from one or more of first pixels in one or more of neighboring blocks located in the same current frame, comprising:
 a bitstream extractor configured to extract coded coefficient information of a residual block of the current block and prediction mode information of the current block from a bitstream, the prediction mode information representing an intra prediction mode of the current block by the unit of the current block or subblocks thereof;
 a prediction mode selector configured to select an intra prediction mode of the current block depending on a pixel value variation of second pixels in the neighboring blocks, the second pixels in the neighboring blocks being located in the same current frame and adjacent to the current block, wherein the intra prediction mode indicates a prediction direction selected from a plurality of intra prediction directions to generate a predicted block of the current block when the intra prediction on the current block is performed, and wherein the second pixels to derive the pixel value variation thereof are selected in the neighboring blocks irrespective of the intra prediction mode of the current block, whereas the first pixels are selected in the neighboring blocks according to the intra prediction mode of the current block; and
 an intra prediction decoder configured to reconstruct the current block by decoding the residual block of the current block from the coded coefficient information and performing the intra prediction on the current block according to the intra prediction mode of the current block to generate the predicted block of the current block,
 wherein the prediction mode information is not extracted from the bitstream and a preset intra prediction mode is selected as the intra prediction mode of the current block, when the pixel value variation is smaller than a threshold, and
 the intra prediction mode of the current block is selected among a plurality of intra prediction modes according to the extracted prediction mode information, when the pixel value variation is greater than the threshold.

10. The video decoding apparatus of claim 9, wherein the bitstream has the coded coefficient information assigned in placement ahead of the prediction mode information when the coded coefficient information and the prediction mode information are included by the unit of the current block or subblocks thereof.

11. The video decoding apparatus of claim 9, wherein the preset intra prediction mode is an intra prediction mode for predicting an average value of pixel values of the pixels adjacent to the current block as predicted pixel values of pixels of the current block.

12. The video decoding apparatus of claim 9, wherein the prediction mode selector is configured to calculate the pixel value variation by using a degree of scattering selected from the group consisting of a dispersion, a standard deviation, a mean deviation, and a quartile deviation.

13. The video decoding apparatus of claim 9, wherein the prediction mode selector is configured to compare the pixel value variation against the threshold to select the intra prediction mode of the current block, the threshold being set according to a quantization coefficient and a quantization step size of the current block.

14. A video decoding method for predicting a current block in a current frame by using an intra prediction in which the current block is predicted from one or more of first pixels in one or more of neighboring blocks located in the same current frame, comprising:
 extracting coded coefficient information of a residual block of the current block and prediction mode information of the current block from a bitstream the prediction mode information representing an intra prediction mode of the current block by the unit of the current block or subblocks thereof;
 selecting an intra prediction mode of the current block depending on a pixel value variation of second pixels in the neighboring blocks, the second pixels in the neighboring blocks being located in the same current frame and adjacent to the current block, wherein the intra prediction mode indicates a prediction direction selected from a plurality of intra prediction directions to generate a predicted block of the current block when the intra prediction on the current block is performed, and wherein the second pixels to derive the pixel value variation thereof are selected in the neighboring blocks irrespective of the intra prediction mode of the current block, whereas the first pixels are selected in the neighboring blocks according to the intra prediction mode of the current block; and
 reconstructing the current block by decoding the residual block of the current block from the coded coefficient information and performing the intra prediction on the current block according to the intra prediction mode of the current block to generate the predicted block of the current block,
 wherein the prediction mode information is not extracted from the bitstream and a preset intra prediction mode is selected as the intra prediction mode of the current block, when the pixel value variation is smaller than a threshold, and
 the intra prediction mode of the current block is selected among a plurality of intra prediction modes according to the extracted prediction mode information, when the pixel value variation is greater than the threshold.

15. An apparatus for selecting an intra prediction mode of a current block in a current frame to predict the current block by using an intra prediction in which the current block is predicted from one or more of first pixels in one or more of neighboring blocks located in the same current frame, the apparatus comprising:
 a variation calculator configured to calculate a pixel value variation of second pixels in the neighboring blocks, the second pixels in the neighboring blocks being located in the same current frame and adjacent to the current block, wherein the second pixels to derive the pixel value variation thereof are selected in the neighboring blocks irrespective of the intra prediction mode of the current block, whereas the first pixels are selected in the neighboring blocks according to the intra prediction mode of the current block;
 a mode selector configured to
  select a preset intra prediction mode as the intra prediction mode of the current block when the pixel value variation is smaller than a threshold, and
  select a single intra prediction mode from a plurality of intra prediction modes according to a preset mode selection criterion, when the pixel value variation is greater than the threshold, to thereby determine the single intra prediction mode as the intra prediction mode of the current block, wherein the intra prediction mode indicates a prediction direction selected from a plurality of intra prediction directions to generate a predicted block of the current block when the intra prediction on the current block is performed; and a mode bit generator configured to selectively encode prediction mode information for representing the intra prediction mode of the current block by the unit of the current block or subblocks thereof, depending on the pixel value variation of the second pixels in the neighboring blocks, wherein the prediction mode information is not encoded into the bitstream when the pixel value variation is smaller than a threshold, and the prediction mode information is encoded into the bitstream when the pixel value variation is greater than the threshold.

16. The apparatus of claim 15, wherein the mode bit generator is configured to generate the prediction mode information when the calculated pixel value variation is greater than the threshold.

17. The apparatus of claim 15, wherein, when the coded coefficient information and the prediction mode information are included by the unit of the current block or subblocks thereof, the coded coefficient information is assigned in placement ahead of the prediction mode information.

18. A method for selecting an intra prediction mode of a current block in a current frame to predict the current block by using an intra prediction in which the current block is predicted from one or more of first pixels in one or more of neighboring blocks located in the same current frame, the method comprising:

calculating a pixel value variation of second pixels in the neighboring blocks, the second pixels in the neighboring blocks being located in the same current frame and adjacent to the current block, wherein the second pixels to derive the pixel value variation thereof are selected in the neighboring blocks irrespective of the intra prediction mode of the current block, whereas the first pixels are selected in the neighboring blocks according to the intra prediction mode of the current block;

selecting a preset intra prediction mode as the intra prediction mode of the current block when the pixel value variation is smaller than a threshold;

selecting a single intra prediction mode from a plurality of intra prediction modes according to a preset mode selection criterion, when the pixel value variation is greater than the threshold to thereby determine the single intra prediction mode as the intra prediction mode of the current block; and selectively encoding prediction mode information for representing the intra prediction mode of the current block depending on the pixel value variation of the second pixels in the neighboring blocks, wherein the intra prediction mode indicates a prediction direction selected from a plurality of intra prediction directions to generate a predicted block of the current block when the intra prediction on the current block is performed, wherein the prediction mode information is not encoded into the bitstream when the pixel value variation is smaller than a threshold, and the prediction mode information is encoded into the bitstream when the pixel value variation is greater than the threshold.

19. An apparatus for selecting an intra prediction mode of a current block in a current frame to predict the current block by using an intra prediction in which the current block is predicted from one or more of first pixels in one or more of neighboring blocks located in the same current frame, the apparatus comprising:

a variation calculator configured to calculate a pixel value variation of second pixels in the neighboring blocks, the second pixels in the neighboring blocks being located in the same current frame and adjacent to the current block, wherein the second pixels to derive the pixel value variation thereof are selected in the neighboring blocks irrespective of the intra prediction mode of the current block, whereas the first pixels are selected in the neighboring blocks according to the intra prediction mode of the current block; and a mode selector configured to select a preset intra prediction mode as the intra prediction mode of the current block when the pixel value variation is smaller than a threshold, and select a single intra prediction mode from a plurality of intra prediction modes based on prediction mode information of the current block according to a preset mode selection criterion and determine the single intra prediction mode as the intra prediction mode of the current block when the pixel value variation is greater than the threshold, the prediction mode information being extracted from a bitstream by the unit of the current block or subblocks thereof, wherein the intra prediction mode indicates a prediction direction selected from a plurality of intra prediction directions to generate a predicted block of the current block when the intra prediction on the current block is performed.

20. A method for selecting an intra prediction mode of a current block in a current frame to predict the current block by using an intra prediction in which the current block is predicted from one or more of first pixels in one or more of neighboring blocks located in the same current frame, the method comprising:

calculating a pixel value variation of second pixels in the neighboring blocks, the second pixels in the neighboring blocks being located in the same current frame and adjacent to a current block, wherein the second pixels to derive the pixel value variation thereof are selected in the neighboring blocks irrespective of the intra prediction mode of the current block, whereas the first pixels are selected in the neighboring blocks according to the intra prediction mode of the current block;

when the pixel value variation is smaller than a threshold, selecting a preset intra prediction mode as the intra prediction mode of the current block; and when the pixel value variation is greater than the threshold, selecting a single intra prediction mode from a plurality of intra prediction modes based on prediction mode information of the current block according to a preset mode selection criterion and determining the single intra prediction mode as the intra prediction mode of the current block, the prediction mode information of the current block being extracted from a bitstream by the unit of the current block or subblocks thereof, wherein the intra prediction mode indicates a prediction direction selected from a plurality of intra prediction directions to generate a predicted block of the current block when the intra prediction on the current block is performed.

* * * * *